US 8,296,098 B2

(12) United States Patent
Mills

(10) Patent No.: US 8,296,098 B2
(45) Date of Patent: Oct. 23, 2012

(54) METROLOGICAL INSTRUMENT

(75) Inventor: Michael Mills, Leicester (GB)

(73) Assignee: Taylor Hobson Limited, Leicester (GB)

( * ) Notice: Subject to any disclaimer, the term of this patent is extended or adjusted under 35 U.S.C. 154(b) by 735 days.

(21) Appl. No.: 11/815,300

(22) PCT Filed: Jan. 25, 2006

(86) PCT No.: PCT/GB2006/000242
§ 371 (c)(1),
(2), (4) Date: May 4, 2010

(87) PCT Pub. No.: WO2006/082368
PCT Pub. Date: Aug. 10, 2006

(65) Prior Publication Data
US 2010/0217561 A1 Aug. 26, 2010

(30) Foreign Application Priority Data
Feb. 1, 2005 (GB) .................................. 0502062.3

(51) Int. Cl.
*G01B 21/20* (2006.01)
*G01B 5/20* (2006.01)
*G01C 17/38* (2006.01)

(52) U.S. Cl. ............. 702/168; 702/95; 702/167; 33/553
(58) Field of Classification Search .................. 702/168; 33/553
See application file for complete search history.

(56) References Cited

U.S. PATENT DOCUMENTS

| 4,509,263 | A | 4/1985 | Andrie et al. |
| 4,672,750 | A | 6/1987 | Storace et al. |
| 5,517,307 | A | 5/1996 | Buehring et al. |

(Continued)

FOREIGN PATENT DOCUMENTS

EP 0 100 716 2/1984

(Continued)

OTHER PUBLICATIONS

UK Search Report for Application No. GB 9725779.4; Dated Feb. 16, 1998.

(Continued)

*Primary Examiner* — Timothy Thompson
*Assistant Examiner* — Rhadames J Alonzo Miller
(74) *Attorney, Agent, or Firm* — RatnerPrestia

(57) ABSTRACT

A metrological instrument determines a surface profile or form of a surface (61) of a workpiece (60) by effecting relative movement between a probe (11, 12) and the surface (61) so that the probe follows and is displaced by changes in the surface topography. A measure of the displacement of the probe as it follows the surface is obtained by a displacement provider which may be an interferometric gauge (35). Instead of making a measurement along a single measurement path over the surface (61), respective measurements are made on sections (61*d* and 61*e* or 61*g* and 61*h*) of that measurement path to obtain corresponding measurement data sets and these measurement data sets are independently positioned or aligned to a reference data set. The reference data set may be obtained by a measurement made on another section (61*c*) of the measurement path (61), on another measurement path (61*f*) over another surface (62*a* and 62*b*) of the component or on another measurement path over a surface on which the component is located. The aligned measurement data sets are then merged together to form a profile of the surface.

46 Claims, 12 Drawing Sheets

U.S. PATENT DOCUMENTS

| | | | |
|---|---|---|---|
| 5,960,379 | A | 9/1999 | Shimizu et al. |
| 7,055,367 | B2 | 6/2006 | Hajdukiewicz et al. |
| 7,173,691 | B2 * | 2/2007 | Murphy et al. ............. 356/138 |
| 7,254,506 | B2 * | 8/2007 | McMurtry et al. ............ 702/95 |
| 2002/0059041 | A1 | 5/2002 | Mills |
| 2002/0183964 | A1 * | 12/2002 | Handa et al. ................. 702/167 |
| 2004/0088874 | A1 * | 5/2004 | Sohn et al. ..................... 33/554 |
| 2004/0244464 | A1 | 12/2004 | Hajdukiewicz et al. |
| 2005/0132591 | A1 * | 6/2005 | Kojima et al. ................. 33/503 |
| 2005/0235507 | A1 * | 10/2005 | Badami et al. ................. 33/507 |
| 2006/0106569 | A1 * | 5/2006 | Kosiorek et al. ............. 702/166 |

FOREIGN PATENT DOCUMENTS

| | | |
|---|---|---|
| EP | 0 240 151 | 10/1987 |
| EP | 1 324 006 | 7/2003 |
| EP | 1 555 561 | 7/2005 |
| GB | 1 571 397 | 7/1980 |
| GB | 2 237 661 | 5/1991 |
| GB | 2 251 945 | 7/1992 |
| GB | 2 306 654 | 5/1997 |
| GB | 2 332 056 | 6/1999 |
| GB | 2 378 254 | 2/2003 |
| JP | 02259509 A | 10/1990 |
| JP | 07091933 A | 4/1995 |
| JP | 07174535 A | 7/1995 |
| JP | 08233506 A | 9/1996 |
| JP | 09033244 A | 2/1997 |
| JP | 09218034 A | 8/1997 |
| JP | 10160428 A | 6/1998 |
| JP | 11037732 A | 2/1999 |
| JP | 2000337862 A | 12/2000 |
| JP | 2001227940 A | 8/2001 |
| JP | 2003014449 A | 1/2003 |
| JP | 2003500675 A | 1/2003 |
| JP | 2003057016 A | 2/2003 |
| JP | 2004286561 A | 10/2004 |
| WO | WO-0073731 A1 | 12/2000 |

OTHER PUBLICATIONS

UK Search Report for Application No. GB 0502062.3; Dated Jun. 2, 2005.

*Form Talysurf PGI 1240 Aspherics Measurement System*; Taylor Hobson Precision; PGI 1240 1E CP Dec. 2002.

*Thales Optics, Test*; http://www.thales-optics.co.uk/capabilities/test.htm.; Mar. 24, 2004.

*Thales Optics, Company Overview*; http://www.thales-optics.co.uk/; Mar. 24, 2004.

*DIFFSYS2004; Contact Us*; http://www.diffsys.com/page14.html; Apr. 15, 2004.

DIFFYS2004; DIFFSYS Specifications; http://www.diffsys.com/page8/html; Apr. 15, 2004.

DIFFYS2004; DIFFSYS Overview; http://www.diffsys.com/page2.html.; Apr. 15, 2004.

DIFFYS2004; Measurement corrections (including Talysurf®); http://www.diffsys.com/page5.html; Apr. 4, 2004.

DIFFYS2004; Future plans for DIFFSYS; http://www.diffsys.com/page12.html; Apr. 15, 2004.

International Search Report for PCT/GB2006/000242; Mailed Jul. 18, 2006.

PCT Written Opinion of the International Searching Authorityfor PCT/GB2006/000242; Mailed Jul. 18, 2006.

Japanese Application Serial No. 2007553681, Office Action mailed Oct. 7, 2011, 11 pgs.

* cited by examiner

METROLOGICAL INSTRUMENT

This application is a U.S. National Phase Application of PCT International Application PCT/GB/2006/000242. This application claims priority of GB 0502062.3 and is incorporated herein in its entirety.

BACKGROUND

This invention relates to a metrological instrument capable of measuring the profile or form (that is the overall shape) of a surface of a workpiece or component.

Taylor Hobson Limited, a division of Ametek Inc., manufactures a number of surface profile or form measuring metrological instruments which use a measurement probe in the form of a mechanical stylus to determine the profile or form of the surface. In many of these instruments, relative movement is effected between the stylus and the component along a measurement path (traditionally denoted as the "x axis") and surface changes in the z direction cause an arm carrying the stylus to pivot or rotate about an axis as the stylus follows these surface changes. A measurement gauge, in this case an interferometric gauge, measures the z displacement.

One type of such a metrological instrument manufactured by Taylor Hobson is the Form Talysurf PGI (Registered Trade Mark) series. This series of instruments has a particularly good range-to-resolution ratio and so is capable of making measurements of both form and surface roughness or texture on surfaces having a significant degree of form. This makes the use of the Form Talysurf PGI series of instruments particularly advantageous for aspheric surface measurement.

In measuring an aspheric component with such a metrological instrument, it is usual that a measurement be taken over a measurement path between opposed points on the surface and passing through a point on the surface through which an axis of rotation of the component extends, so that in the case of an aspheric body having a circular base the measurement path represents a projection of the diameter of the circular base onto the aspheric surface. For this reason the measurement path may be referred to as a "diametral path".

The component is usually positioned so that the rotational axis is nominally aligned to the z-axis of the metrological instrument.

In some circumstances it may not be possible to measure the full diametral path of the component due to physical limitations. These limitations might, for example, be that the component dimensions exceed the measurement envelope of the instrument (for example the diameter is longer than the maximum measurement length), or that at least part of the slope of the component surface is too great. Typically, the maximum gradient in the x-z plane which can be measured by a Form Talysurf PGI metrological instrument is about 30°, beyond which the stresses applied to the stylus arm may become too great and may induce bending. Where the surface to be measured is a recessed or concave surface, then another physical constraint may be the dimensions of the measurement probe.

One type of component for which the latter two issues may arise is a mould for small aspheric lenses, particularly lenses for use in digital cameras and mobile telephones because such lenses may have a base diameter in the region of less than 10 millimetres. The issue of surface gradient may also be a problem when measuring the lenses produced by such moulds.

The gradient problem is also becoming increasingly prevalent in the field of lenses for optical storage devices such as Digital Versatile Disc (DVD) recorders and players. This is because, as the demand for increased data storage capacity becomes greater, the optical resolving power of the light used to burn data onto a DVD must become higher. This is being achieved by decreasing the wavelength of the light source from infra-red to blue light. Systems using blue light may, however, require lenses with a greater degree of asphericity and so at least part of the lens surface may have a gradient greater than 30°.

SUMMARY

An aspect of the present invention provides a metrological instrument for determining a surface profile or form of a surface of a workpiece by effecting relative movement between a probe and the surface so that the probe follows and is displaced by changes in the surface topography and by determining a measure of the displacement of the probe as it follows the surface, wherein, instead of making a measurement along a single measurement path over the surface, respective measurements are made on sections of that measurement path to obtain corresponding measurement data sets and these measurement data sets are positioned or aligned by using a reference data set (obtained by at least one measurement made on another section of the measurement path over the surface, on another measurement path over another surface of the component and on another measurement path over a surface on which the component is located) and the aligned measurement data sets are then merged together. The reference data set may not form part of the data that is merged together.

An embodiment of the present invention enables the form of a surface to be determined by making a measurement on one section of the measurement path then repositioning the workpiece and making a measurement on another section of the measurement path. This enables measurements of surface form or profile to be made on components that would be difficult to measure using a single measurement path. For example in the case of a surface having a steep gradient (such as the lens moulds or lenses mentioned above), the component may be tilted or rotated about its optical axis in one direction for measurement along a section of the surface from one end of the surface and then tilted or rotated in the opposite direction for measurement along a section of the surface from the other end of the surface, so reducing the surface gradient of those surface sections relative to the probe and also facilitating access of the probe to those surfaces sections. In this case, the reference data set enables accurate rotation of the measurement data sets to enable their alignment to produce the profile.

The reference data set may be obtained by measurement over another section of the measurement path between the said sections of the measurement path. For example in the case of the lens mould or lens mentioned above, the reference data set may be obtained by measurement over a central section of the measurement path including the optical axis. Generally there will be overlap between the measurement sections and between each measurement section and the central section.

As another possibility, the reference data set may be obtained by measurement made on a reference measurement path over another surface of the component. For example in the case of a surface in the form of a cavity in a planar mould surface, for example in the case of the lens mould discussed above, the reference data set may be obtained by making measurements on reference measurement paths on respective surface areas of the planar mould surface on either side of the cavity. As another possibility, the reference data set may be obtained by making measurements on reference measurement path sections on surface areas of a glass flat or other reference surface on which the component is placed during the measurement process. This technique may, for example, be used in the case of a convex surface of a workpiece such as the lens discussed above. In either case, this enables a reference data set to be obtained defining a baseline against which the rotation or tilting of the workpiece to obtain the measurement data sets can be referenced to enable accurate relative rotation of the measurement data sets to align them.

The use of the reference data set enables the measurement data sets to be stitched or merged together so as to reconstruct the desired diametral trace by enabling re-orientation of the measurement data sets to take account of the change in orientation of the workpiece or component between measurement of the different sections. This reduces or minimises the increase in measurement uncertainty resulting from the fact that the diametral trace was obtained by measurements on different sections of the measurement path with the component in a different orientation for each measurement.

Embodiments of the present invention will now be described, by way of example, with reference to the accompanying drawings, in which:

DETAILED DESCPIPTION

Figure 1:
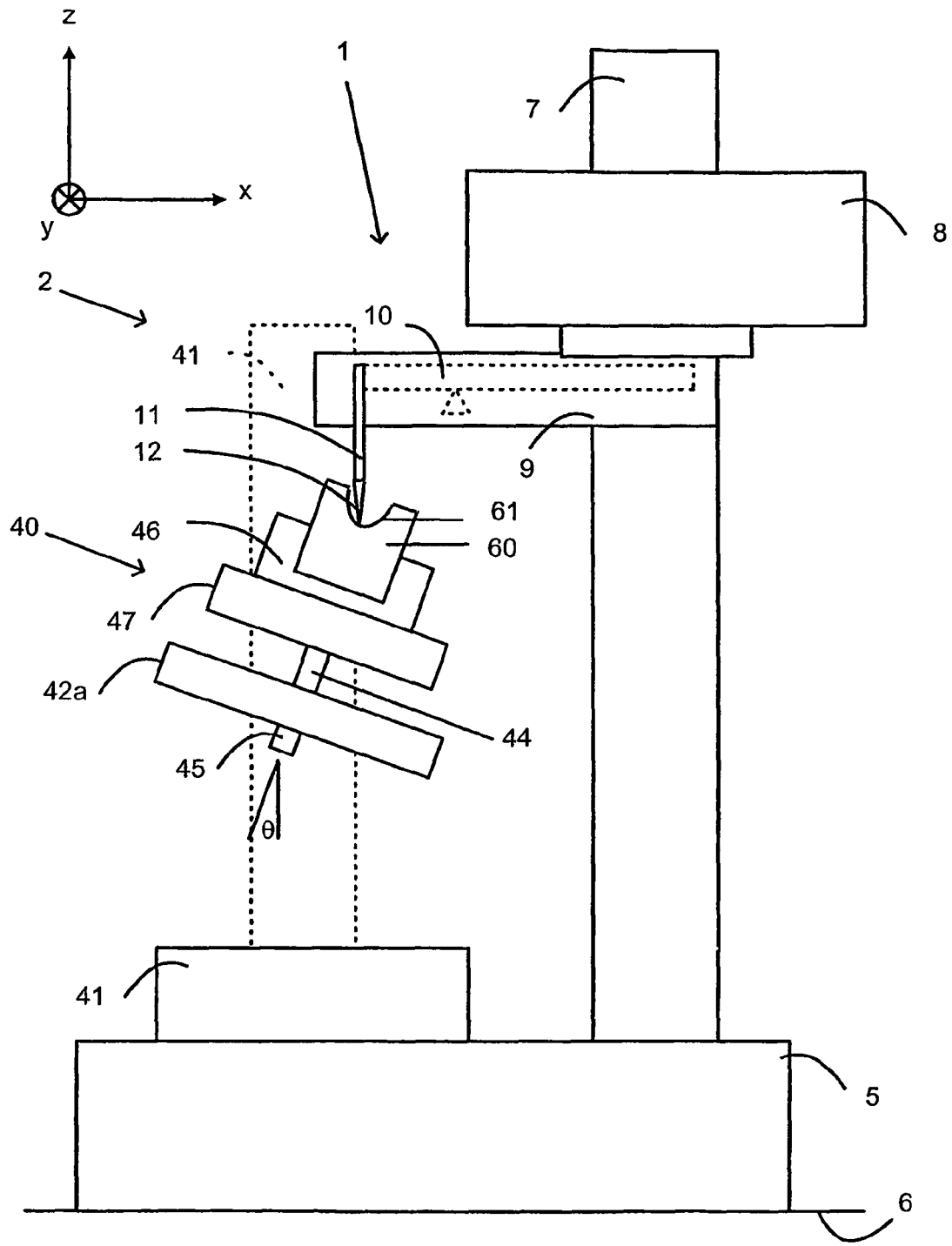
FIG. 1 shows a very schematic representation of a view, looking in a direction perpendicular to a measurement direction, of a metrological apparatus of a metrological instrument embodying the present invention.
Figure 2:
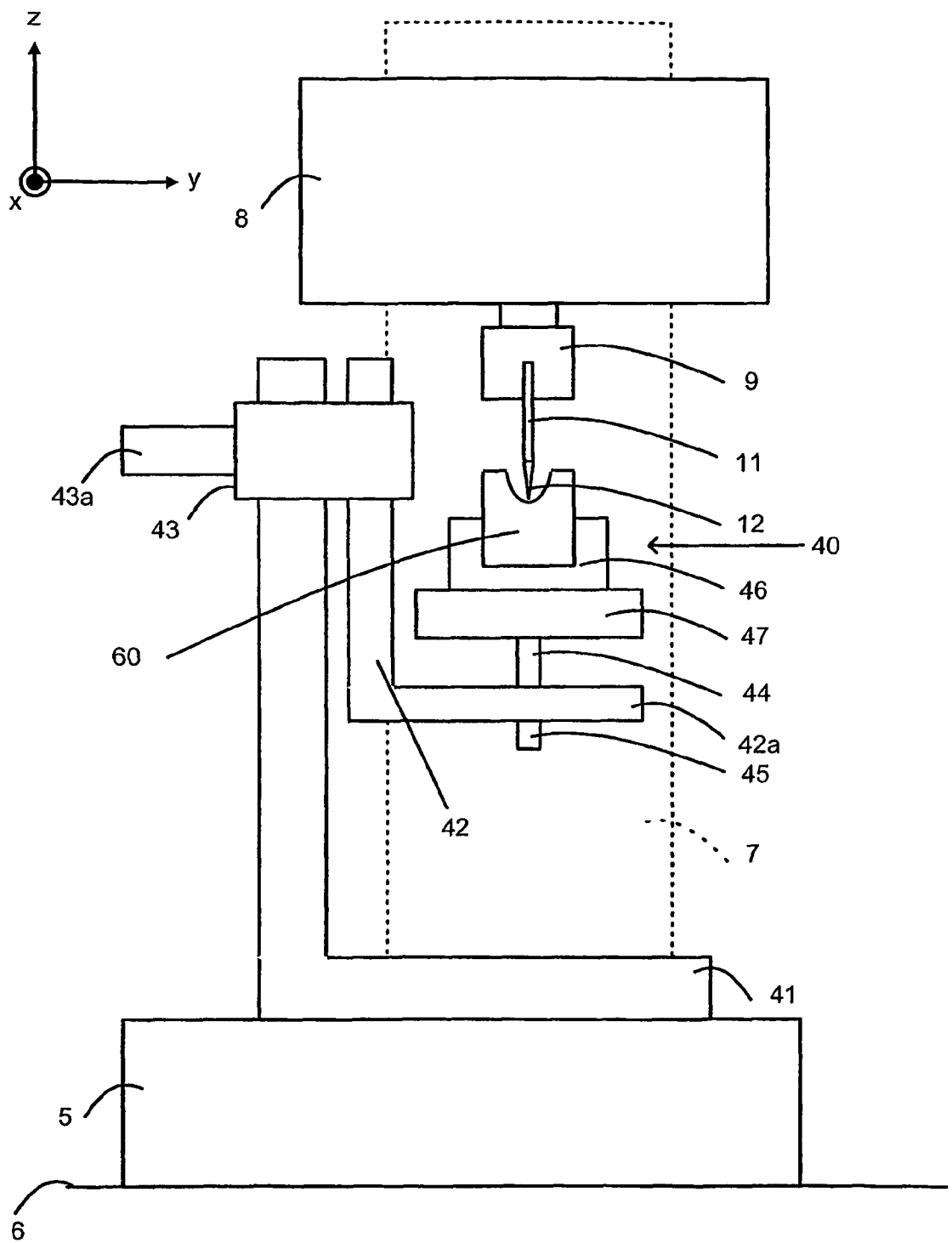
FIG. 2 shows a very schematic representation, looking in the measurement direction, of the metrological apparatus shown in FIG. 1.

Referring now to the drawings, the metrological instrument to be described comprises a metrological apparatus and a control apparatus. FIGS. 1 and 2 show very diagrammatic representations of the metrological apparatus 2 of the metrological instrument 1 with FIG. 1 looking generally in the y direction (that is the direction perpendicular to the measurement direction) and FIG. 2 looking generally in the measurement direction (that is the x direction). In the interests of clarity certain components shown in FIG. 1 may not be shown or may not be shown fully in FIG. 2 and vice versa. Some components are for similar reasons illustrated by phantom lines in FIGS. 1 and 2. Also, it will be appreciated that FIGS. 1 and 2 are not to scale and that the relative dimensions are shown differently in FIGS. 1 and 2.

Figure 3A:
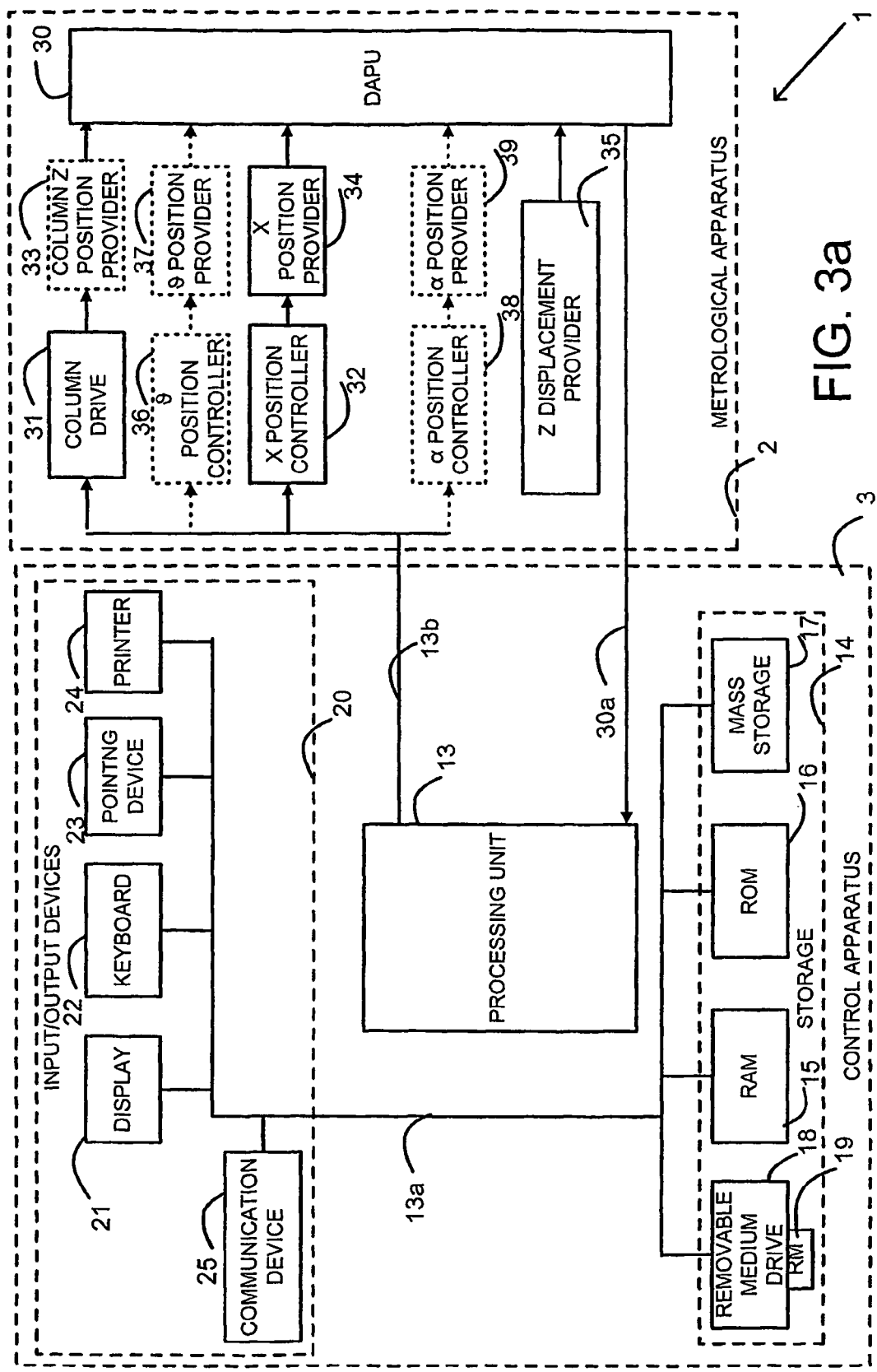
FIG. 3a shows a functional block diagram illustrating the main control components of a metrological instrument embodying the present invention.
Figure 3B:
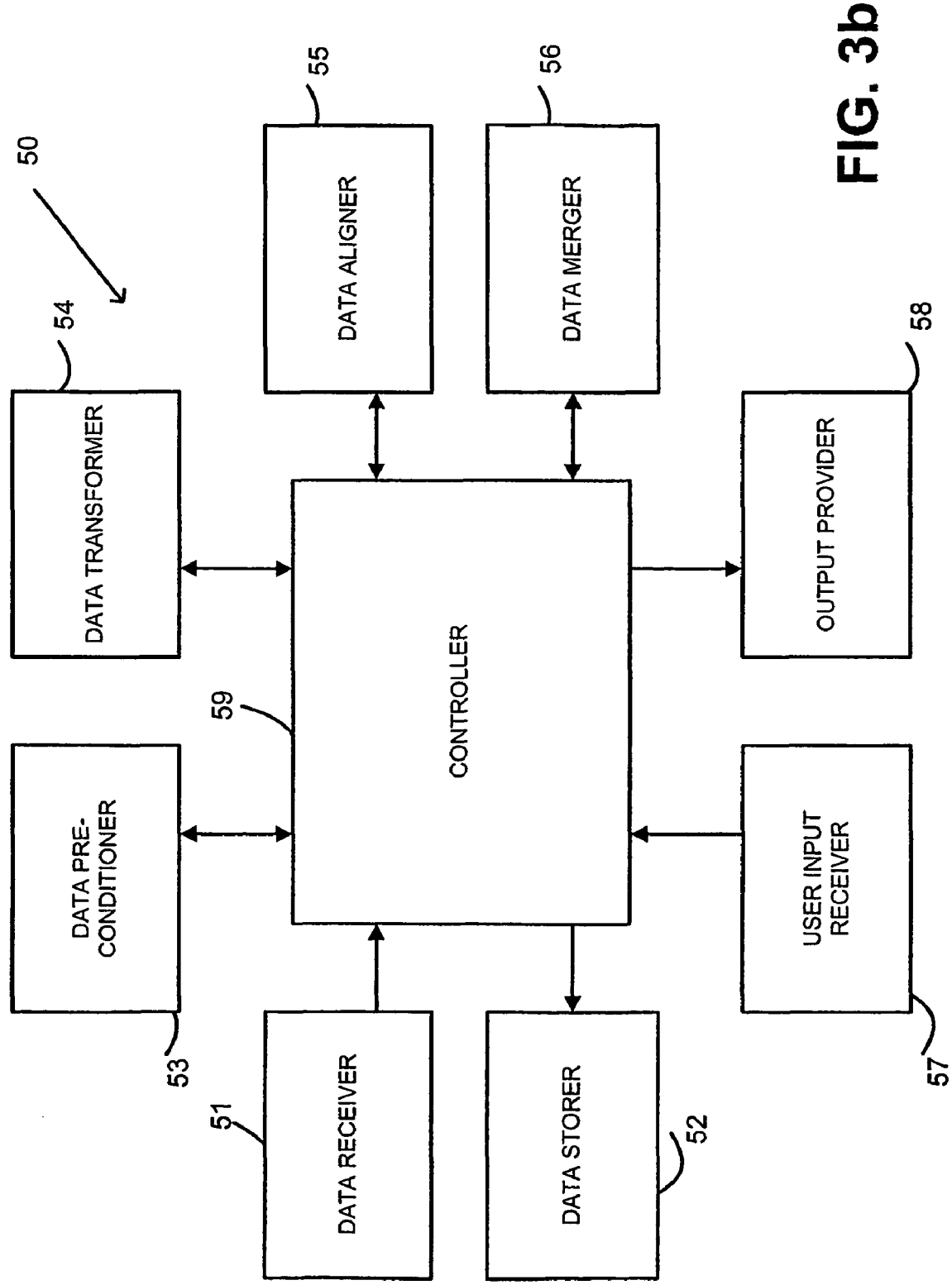
FIG. 3b shows a functional block diagram of a data processor of a metrological instrument provided by programming control apparatus of the metrological instrument.

FIG. 3a shows a block diagram illustrating the main functional components of both the metrological apparatus 2 and the control apparatus 3 of the metrological instrument 1 while FIG. 3b shows a functional block diagram of a data processor 4 of the metrological instrument 1 provided by programming of the control apparatus 3.

The metrological apparatus 2 has a granite base 5 that is designed to be supported by a workbench 6. The base 5 carries a column 7 that defines a vertical or z axis reference datum. A column carriage 8 is mounted to the column 7 so as to be movable in the z direction with respect to the column 7. The movement of the column carriage 8 is effected by a motorised leadscrew, pulley or other drive arrangement (not shown).

The column carriage 8 carries a traverse unit 9, which is movable relative to the column carriage 8 in the x direction by means of a motorised drive arrangement (not shown).

The traverse unit 9 carriage carries a measurement probe which, in this embodiment, consists of a pivotally mounted stylus arm 10 (shown very diagrammatically in FIGS. 1 and 2 in dotted lines within the traverse unit 9) carrying at its free end a stylus 11 having a stylus tip 12 which comes into contact with the surface of the workpiece or component under test during a measurement operation so that, as the traverse unit 9 is moved in the x direction, the stylus arm 10 pivots to enable the stylus tip 12 to follow variations in the z direction along a measurement path on the surface.

Referring now to FIG. 3a, the control apparatus 3 is generally a personal computer and has a processing unit 13 coupled via a bus 13a to associated data and program instruction/software storage 14 in the form of RAM 15, ROM 16, a mass storage device 17 such as a hard disc drive and at least one removable medium drive 18 for receiving a removable medium (RM) 19, such as a CD-ROM, solid state memory card, DVD, or floppy disc. As another possibility, the removable medium drive may itself be removable, for example it may be an external hard disc drive.

The control apparatus is also coupled via the same or a different bus to input/output devices 20 comprising a display 21, a keyboard 22, a pointing device 23 such as a mouse, a printer 24 and, optionally, a communications device 25 such as at least one of a MODEM and a network card for enabling the control apparatus 3 to communicate signals S via a wired or wireless connection with other control apparatus or computers via a network such as the Internet, an intranet, a WAN or a LAN.

The processing unit 13 is programmed by program instructions and data provided by being at least one of:
downloaded as a signal S via the communications device 25;
pre-stored in any one or more of ROM 16, RAM 15 and mass
  storage device 17; read from a removable storage medium
  19 received by the removable medium drive 18; and
input by the user using the keyboard 22.

The metrological apparatus 2 has a data acquisition and processing unit (DAPU) 30 that communicates with the processing unit 13 of the control apparatus 3 via an appropriate link, for example a serial link, 30a to enable data regarding a measurement operation to be communicated to the control apparatus 3.

The control components of the metrological apparatus 2 comprise a column drive controller 31 for driving the carriage 8 up and down the column in the z direction, an x position controller 32 for driving the traverse unit 9 in the x direction, and an interferometric z displacement provider 35 for providing a measure of the z displacement of the stylus tip 12 as the stylus 11 follows the surface being measured during movement of the traverse unit 9 along a measurement path in the x direction. Generally the interferometric z displacement provider 35 will be provided within the traverse unit 9.

The x position controller 32 is associated with an x position provider 34 that may be, for example, a shaft encoder associated with a motor providing the x position controller 32 or may be a linear grating type of transducer. The column drive 31 may also be associated with a column z position provider 33 (shown in phantom lines in FIG. 3a), for example a shaft encoder associated with a motor providing the column drive 31, or the column z position may be determined in an open loop manner directly from the column motor drive signal. As show in FIG. 3a, the column drive 31 and x position controller 32 are coupled to the control apparatus 3 (via a link 13b and appropriate interfaces, not shown) for control by instructions from the control apparatus 3. At least some of these instructions may be supplied by the user.

The metrological instrument 1 so far described is the type of metrological instrument manufactured by Taylor Hobson as the Form Talysurf PGI series.

These instruments are the subject of U.S. Pat. No. 5,517,307 (the whole contents of which are hereby incorporated by reference) to which reference should be made for further details of the metrological instrument so far described. In particular the metrological instrument is based on Taylor Hobson's Form Talysurf PGI 1240® metrological instrument, described in the brochure produced by Taylor Hobson entitled "Form Talysurf PGI 1240, Aspherics Measurement system". This Form Talysurf PGI series of metrological instruments is particularly suited to measuring the surface form (and also roughness) of surfaces having significant form. The primary reason for this is that, as described in U.S. Pat. No. 5,517,307, the interferometric z displacement provider 35 uses a curved diffraction grating that has a radius of curvature which is coincident with the axis about which the stylus arm pivots. This provides more accurate z displacement measurements over a longer range.

The metrological instrument shown in FIGS. 1 to 3b differs from the Form Talysurf PGI 1240 metrological instrument in that that it includes a support assembly for the workpiece or component that enables the workpiece to be tilted in the y axis direction and also to be rotated.

As shown in FIGS. 1 and 2, this support assembly 40 comprises an L-shaped support stand 41 that is clamped or otherwise fixed to the base 5. Generally, although not necessarily, the clamping or fixing allows the stand to be removed and/or its position to be adjusted.

An L-shaped support member 42 (shown only partly in FIG. 1) is coupled to the L-shaped support stand 41 via an axle 43 (see FIG. 2) that enables rotation of the L-shaped support member 42 about the y axis so that a base 42a of the L-shaped support member 42 describes an arc of a circle about the y axis as it is rotated.

The L-shaped support arm 42 carries a support platform 47 mounted to the base 42a of the L-shaped support arm 42 via an axle 44 that enables rotation of the support platform 47 about an axis perpendicular to the base 42a of the L-shaped support arm 42. As shown in FIG. 1, the support arm 42 is rotated about the y axis so that the platform 47 is tilted at an angle θ to the z-axis.

In this example the L-shaped support member 42 is rotated by use of a manually rotatable control member 43a that is indexed or otherwise calibrated to enable the angle θ of rotation to be determined accurately. As another possibility, the rotation about the axis may be motorised and the angle θ controlled via the control apparatus 3, in which case, as shown in phantom lines in FIG. 3a, the metrological apparatus will include a θ position controller 36 controlled by the control apparatus 3. If a closed-loop servo arrangement is required, a θ position provider 37 (which may be a shaft encoder) will also be provided to supply to the DAPU 30 a signal indicating the angle θ.

In this example the support platform 47 is rotated by use of a manually rotatable control member 45 that is indexed or otherwise calibrated to enable the angle α of rotation to be determined accurately. As another possibility, this rotation may be motorised and the angle α controlled via the control apparatus 3. If so, then, as shown in phantom lines in FIG. 3a, the metrological apparatus will include an α position controller 38 controlled by the control apparatus. If a closed-loop servo arrangement is required, an α position provider 39 (which may be a shaft encoder) will also be provided to supply a signal indicating the angle α to the DAPU 30.

A receptacle or chuck 46 for securely holding the workpiece or component 60 under test is mounted to the support platform 47 so as to tilt and rotate with the support platform 47.

The support assembly 40 allows the support platform 47, and consequently a component 60 under test, to be tilted and rotated to enable the stylus tip 12 to traverse measurement paths that would otherwise have too great a gradient (typically greater than 30 degrees) to be measured by such a metrological apparatus. Thus, the support assembly 40 allows a first section starting from one end 61a of a measurement path on the surface 61 to be measured by tilting the support platform 47 (and consequently the component 60) and then a second section starting from the other end 61b of a measurement path on the surface 61 to be measured by rotating the support platform 47 (and consequently the component 60) through 180 degrees. This enables easy access to the surface and ensures that, for each section, the surface gradient does not exceed the operational parameters of the metrological instrument.

The control apparatus 3 is provided with the software normally provided for a Form Talysurf PGI series metrological instrument. In addition, the control apparatus 3 is provided (via any one or more of the routes mentioned above) with program instructions and data, for example software routines or modules. These are generally stored in the mass storage device 17 or in the ROM 16. When executed these program instructions program the processing unit 13 to provide the data processor 50 shown in FIG. 3b that enables a profile of a measurement path to be determined by combining independently aligned measurement data sets obtained for different sections of the measurement path.

As shown in FIG. 3b, the data processor 50 provides: a data receiver 51 for receiving data from the metrological instrument 2, a data storer 52 for storing data; a data pre-conditioner 53 for filtering received data to eliminate noise and other unwanted variations; a data transformer 54 for enabling an entire data set to be rotated or translated with respect to another data set; a data aligner 55 for aligning one data set to another using, in this example, a least-squares fitting procedure; and a data merger 56 for stitching or fusing together two sets of data so as to form a single continuous data set. The data processor 50 also provides a user input receiver 57 for receiving user input from the keyboard 22 or pointing device 23 and an output provider 58 for providing output data to at least one of the display 21, the printer 24 and the communications device 25, if present. The data processor 50 also provides a controller 59 for controlling overall operation of the data processor.

The data transformer 54 may enable automatic rotation and translation of data sets in accordance with data representing the θ and α angles (determined by the respective position providers 37 and 39, if provided, or input by the user) and the x position data logged by the DAPU. In this example, however, the data transformer 54 operates in conjunction with graphics processing provided by the computing apparatus (or itself incorporates such graphics processing) to enable data sets to be translated and rotated on screen by an operator using the pointing device 23 or keyboard 22.

Examples of methods embodying the invention will now be described by way of example where the component or workpiece under test is an aspheric lens mould for an aspheric lens to be used in, for example, a digital camera, a mobile telephone (cell phone) camera or DVD recorder, that is a mould for a very small (typically less than 10 millimetres) aspheric lens, and where the component or workpiece under test is the aspheric lens itself. It will however be appreciated that the component or workpiece may be any component or workpiece whose form is to be determined although the metrological instrument is particularly advantageous for use where the component needs to be tilted to enable the gradient of the surface to be within acceptable parameters or to facilitate access to a concave or recessed surface.

A first method of measuring the profile of a measurement path across a surface of an aspheric lens mould will now be described with reference to FIG. 4 which is a flow chart illustrating processes carried out by the data processor 50 and FIGS. 5a to 5c which show schematic representations illustrating the orientation of the lens mould 60 for respective different measurement procedures during the measurement operation. The black dots D in FIGS. 5a to 5c are provided simply to identify one side of the mould to enable the fact of rotation of this rotationally symmetric body to be evident in the Figures.

It is assumed that the support assembly 40 has already been precisely positioned on the base 5. Therefore, initially a set up procedure comprising a standard cresting process is carried out to align the component or workpiece 60 on the support platform 47. This involves finding the lowest point on the measurement path (that is the axis of symmetry of the lens mould) with the support platform 47 not tilted (that is 0 is zero), and then adjusting the position of the chuck 46 on the platform 47 (or the position of the component 60 within the chuck) using adjustment screws or the like, so that the axis of rotation 70 (see FIGS. 5a to 5c) of the support platform 47 is coincident with the optical axis of the lens mould 60. The set up procedure may also involve the operator identifying to the metrological instrument the end points of the measurement path 61 across the mould. Where access to the recessed mould surface is difficult, then the set up procedure may be carried out using a setup component that has the same dimensions and form as the mould surface but is convex rather than concave.

Figure 5A:
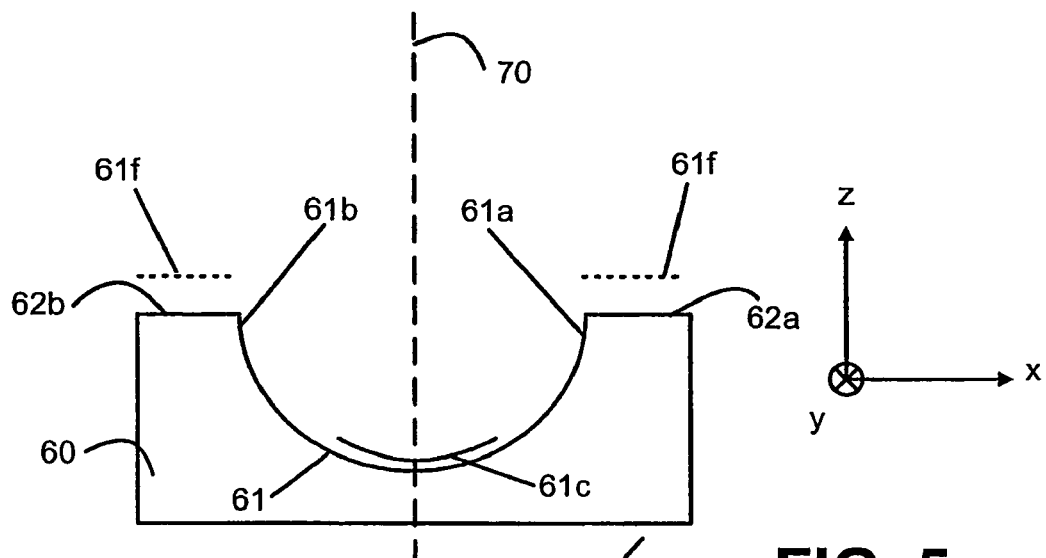
FIG. 5 consists of FIGS. 5a to 5c and shows schematic representations illustrating the orientations of a workpiece in the form of a lens mould during a measurement operation with FIG. 5a showing the orientation during a measurement of a centre section of the measurement path to obtain a reference data set, FIG. 5b showing the orientation during a measurement of a first section at one end of the measurement path to obtain a first section measurement data set and FIG. 5c showing the orientation during a measurement of a second section at the other end of the measurement path to obtain a second section measurement data set.

Once the set up procedure has been completed, then with the support platform 47 still level (that is with the lens mould 60 as shown in FIG. 5a), the operator instructs (via the keyboard 22 and/or pointing device 23) the control apparatus of the metrological instrument to cause a reference measurement procedure to be carried out on a central reference section 61c of the measurement path 61. The reference section 61c is chosen so that it includes the reference axis of the component 60, that is in this case the optical axis 70 of the lens mould. As the traverse unit 9 moves the stylus tip 12 over the central section 61c, the interferometric z displacement provider 35 provides to the DAPU 30 reference section data representing the change in z displacement of the stylus tip 12 with x along the reference section 61c.

Figure 4:
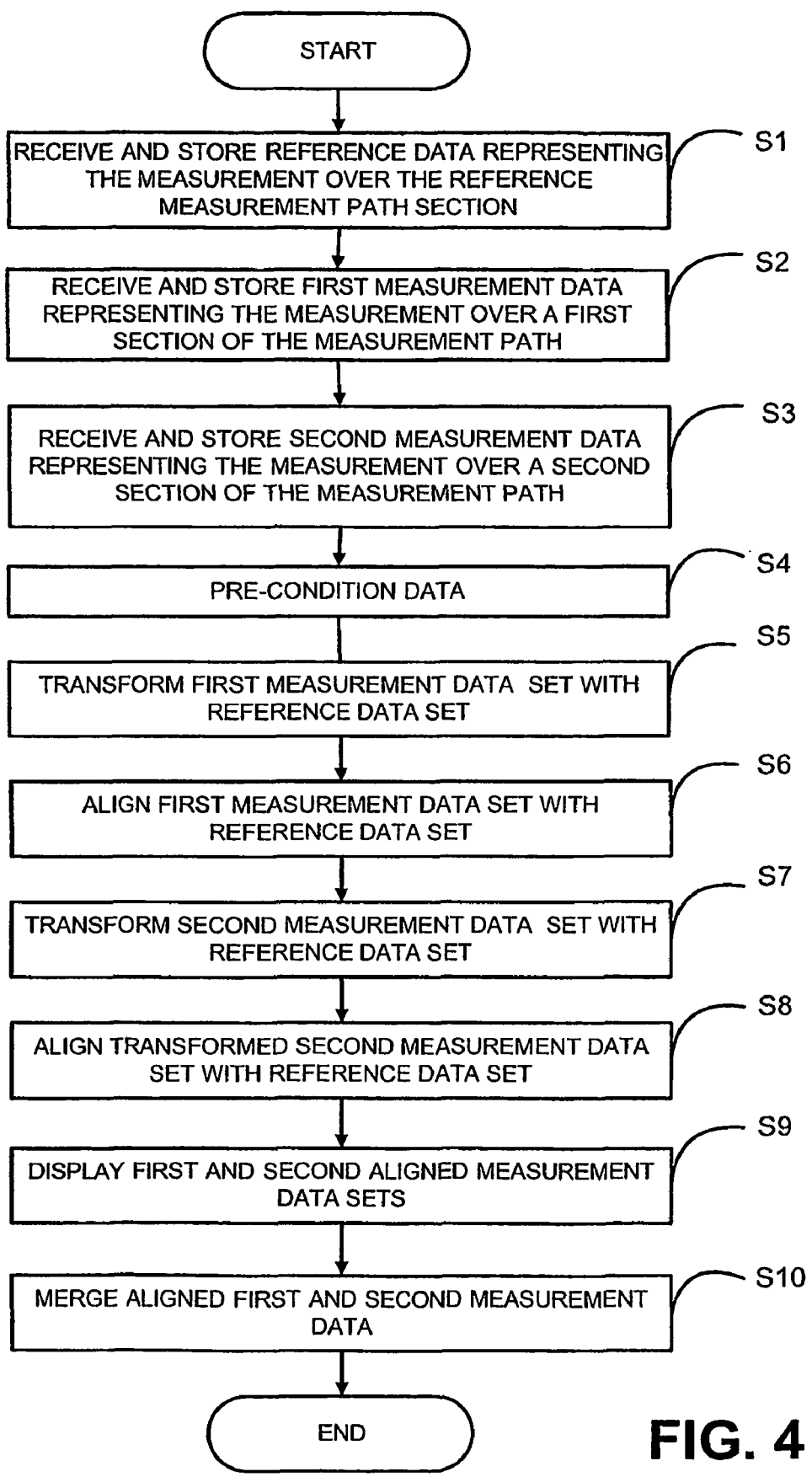
FIG. 4 shows a flow chart for illustrating steps carried out by the data processor in a method embodying the invention for determining the form of a workpiece using the metrological instrument illustrated by FIGS. 1 to 3b.
Figure 5B:
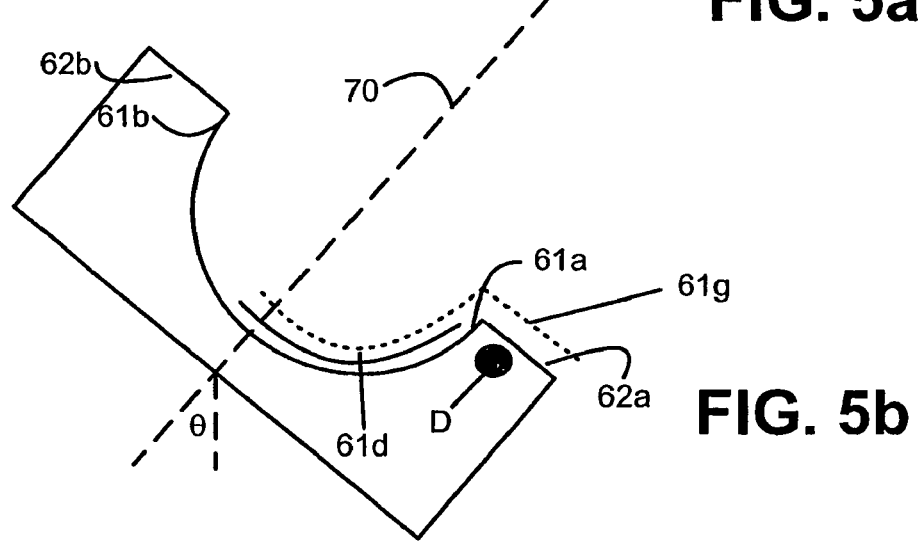
Figure 5C:
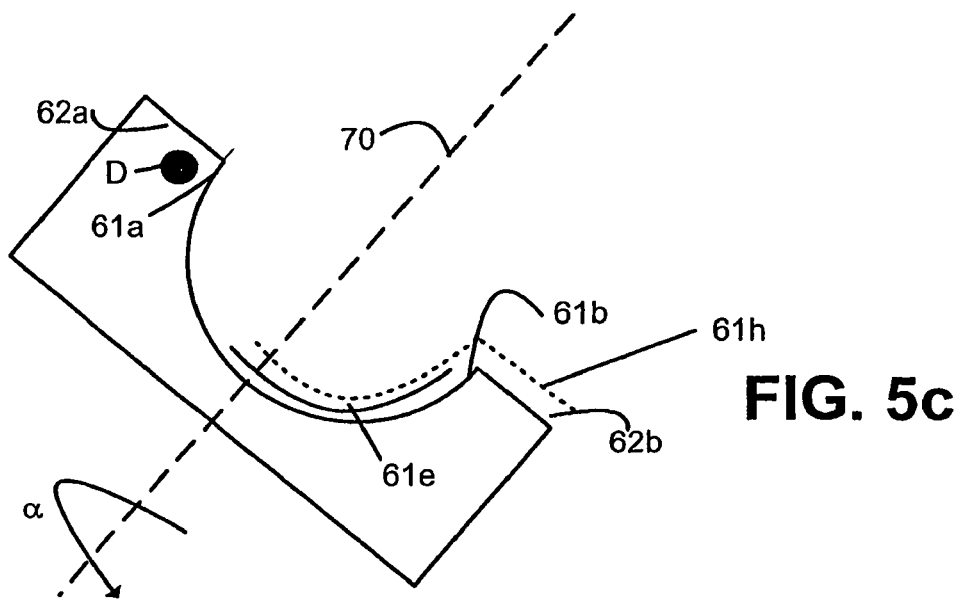

At S1 in FIG. 4, the data receiver 51 of the data processor 50 receives the reference section data from the DAPU 30. The controller 59 causes this data to be stored by the data storer 52 so that, at the end of the reference measurement procedure, the data storer 52 stores a reference data set representing the measurement over the reference section. The controller 59 then causes the output provider 58 to advise the user via the display that the reference measurement has been completed.

In this example, the operator then manually tilts the support platform 47 through an angle θ (in this example 40° but the actual angle will depend of course on the component being measured and the gradient that the stylus is capable of traversing) in the y direction towards the traverse unit 9 (i.e. into the plane of the paper in FIG. 2) to the orientation shown in FIG. 5b using the control member 43a. The operator then instructs (via the keyboard 22 and/or pointing device 23) the control apparatus of the metrological instrument 1 to cause a first measurement procedure to be carried out on a first measurement section 61d of the measurement path 61 starting from just to the left of the axis 70 to just beyond one edge 61a (in this example, the intersection between the lens shape surface and the bounding surface or "wing" 62a of the mould) of the measurement path 61 so that the first measurement section 61d overlaps with the closest end of the reference section 61c. As the traverse unit 9 moves the stylus tip 12 over the first measurement section, the interferometric z displacement provider 35 provides to the DAPU 30 first measurement section data representing the change in z displacement of the stylus tip 12 with x along the first measurement section 61d. At S2 the data receiver 51 of the data processor 50 receives the first measurement section data from the DAPU 30 and the controller 59 causes this data to be stored by the data storer 52. At the end of the first measurement procedure the data storer 52 stores a first measurement section data set representing the measurement over the first measurement section.

The controller 59 then causes the output provider 58 to advise the user via the display that the first measurement section measurement has been completed.

In this example, the operator then manually rotates the support platform 47 through an angle α of 180 degrees to the orientation shown in FIG. 5c using the control member 45. The operator then instructs (via the keyboard 22 and/or pointing device 23) the control apparatus of the metrological instrument 1 causes a second measurement procedure to be carried out on a second measurement section 61e of the measurement path 61 starting from just to the right (left in FIG. 5c because of the rotation) of the axis 70 and extending to just beyond the other edge 61b (in this example, the intersection between the lens shape surface and the bounding surface or "wing" 62b of the mould) of the measurement path 61 so that the second measurement section 61e overlaps with the closest end of the reference section 61c. As the traverse unit 9 moves the stylus tip 12 over the second measurement section 61e, the interferometric z displacement provider 35 provides second measurement section data representing the change in z displacement of the stylus tip with x along the second measurement section 61e to the DAPU 30.

At S3 the data receiver 51 of the data processor 50 receives the second measurement section data from the DAPU 30 and the controller 59 causes this data to be stored by the data store 52. At the end of the second measurement section measurement procedure, the data storer 52 stores a second measurement section data set representing the measurement over the second measurement section 61e. The controller 59 then causes the output provider 58 to advise the user via the display that the second measurement has been completed.

As can be seen from FIGS. 5a to 5c, the first and second measurement path sections overlap not only the reference path section but also each other.

Once the controller 59 determines that the three measurement data sets have been obtained and stored, the controller 59 may instruct the data pre-conditioner 53 to pre-condition the data at S4 by, for example, filtering to remove noise or variations due to environmental conditions or contamination. In this embodiment, an alternating sequence ball filter is used to suppress asperities prior to the data fitting procedures described below. As thus described, the filter is a software filter implemented by the data processor. The filter may, however, be implemented in hardware within the DAPU 30 before the data is supplied to the control apparatus 3, in which case the data pre-conditioner shown in FIG. 3b and the procedure S4 in FIG. 4 will be omitted In this example, the data receiver or acquirer is provided by a graphics package supplied by Taylor Hobson under the trade name µLTRA® for use with, amongst others, the Form Talysurf PGI series of instruments.

The data processor 50 provides a graphical user interface (GUI) that enables measured data sets to be displayed on the display 21 as graphical traces showing the z data provided by the interferometric z displacement provider 35 plotted against the x data logged by the x position provider 34. In this example, the graphical trace of the reference data set will be referred to as "the datum trace" while the trace provided by the first measurement section data set will be referred to as the "RHS trace" where RHS stands for right hand side and the trace provided by the second measurement section data set will be referred to as the "LHS trace" where LHS stands for left hand side.

In practice where two or more different traces are displayed, the data processor 50 displays them using different colours. This is represented in the accompanying Figures by using solid, dot-dash and dashed lines.

Figure 6:
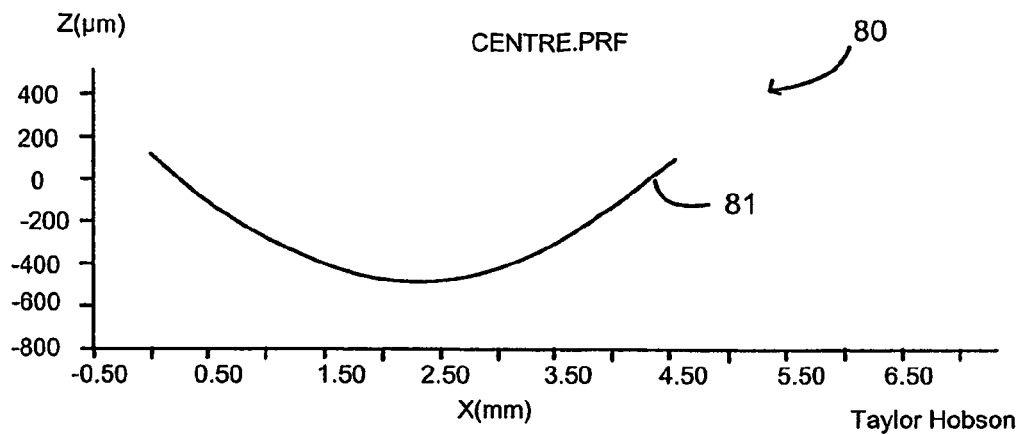
FIG. 6 illustrates a display screen showing a reference or datum trace representing a reference data set produced during a method embodying the invention.

In this example, the operator uses the keyboard 22 and/or pointing device 24 to instruct the controller 59 via the graphical user interface first to display the datum trace that is the profile of the reference data set. When the user input receiver 57 of the data processor 50 receives such an instruction, the controller 59 causes the output provider 58 to display the reference data set as a datum trace. FIG. 6 illustrates a display screen (or window within a display screen) 80 showing the datum trace 81.

Figure 7A:
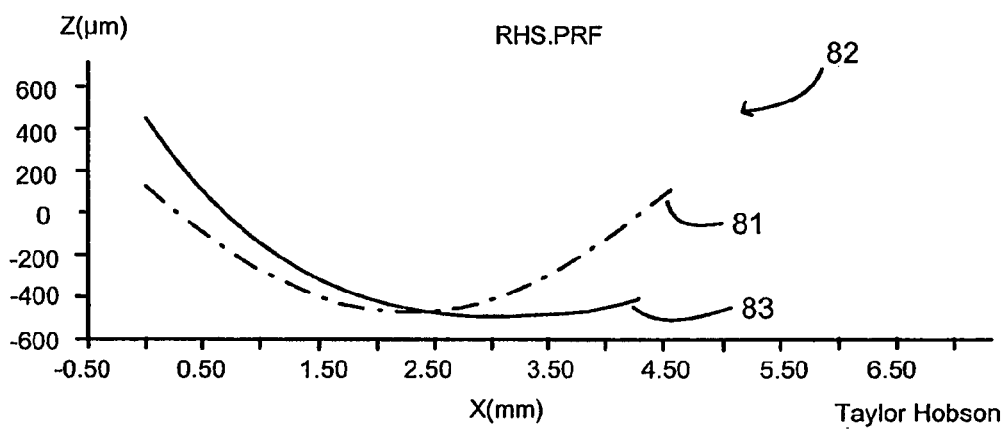
FIG. 7a illustrates a display screen showing a first measurement trace representing the first section measurement data set produced by measurement of the first section in FIG. 5b with the reference datum trace being shown in dot-dash lines.

The operator then uses the keyboard 22 and/or pointing device 24 to instruct the data processor 50 via the graphical user interface to display the first measurement section datum as the RHS trace together with the datum trace. FIG. 7a illustrates a display screen (or window within a display screen) 82 showing the RHS trace 83 (shown as a solid line) together with the datum trace 81 (shown as a dot-dash line).

The graphical user interface (GUI) of the data processor 50 provides, as is well known for graphics packages, user operable controls that enable mirroring (reflection), rotation and translation of a selected displayed object, a graphically represented trace in this case.

The operator roughly aligns the RHS trace to the datum trace by eye by selecting the RHS trace and using the user operable controls of the GUI to move and/or rotate the entire RHS trace as a single body by translating the trace in the x- and z-directions and rotating the trace about an axis in the y-direction (this is perpendicular to the display screen) so that it is approximately aligned with the datum trace. Thus the graphical display enables an initial rough alignment to be effected by eye.

Figure 7B:
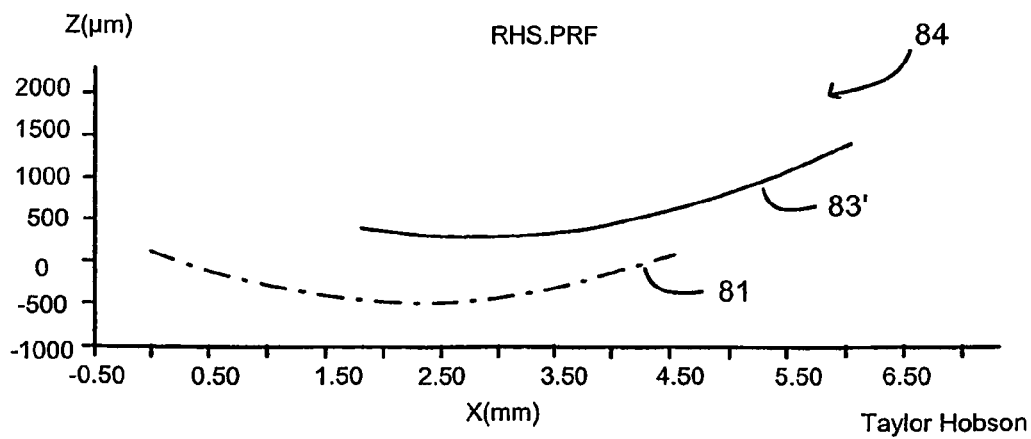
FIG. 7b illustrates a display screen showing the first measurement trace and the reference trace (with the reference datum trace being shown in dot-dash lines), after approximate alignment of the first measurement trace to the reference trace.

FIG. 7b illustrates a display screen (or window within a display screen) 84 showing the transformed RHS trace 83' together with the datum trace 81 (it will be appreciated that the datum trace looks different in FIG. 7b because of the change in the z axis scale). This causes the controller 59 to instruct the data transformer 54 to effect a transformation on the first measurement section data set to transform (S5 in FIG. 4) the first measurement section data set in accordance with the transformation of the RHS trace by the operator. The data storer 52 stores the transformed first measurement section data set.

Figure 8:
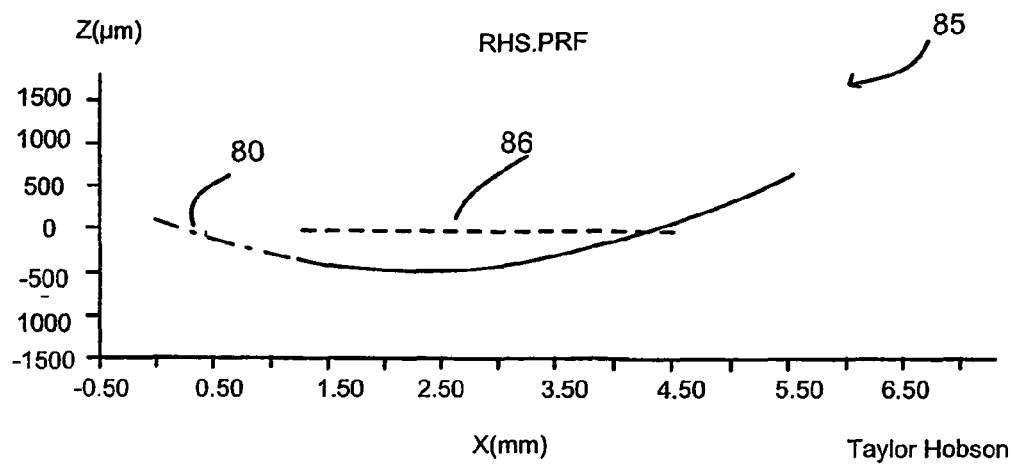
FIG. 8 illustrates a display screen showing the first measurement trace and the reference trace (with the reference or datum trace being shown in dot-dash lines), after alignment by least squares fitting of the first measurement trace to the reference trace.

The operator then instructs the controller 59 to cause the data aligner 55 to align the transformed RHS trace 83' to the datum trace 81, that is to align the stored transformed first measurement data set to the reference data set. Thus, at S6 in FIG. 4, the data aligner 55 uses a known alignment procedure such as a least-squares fitting procedure that adjusts the rotation and x and z positions of the RHS trace until the least squares error is a minimum, at which point the RHS trace is considered aligned to the datum trace. FIG. 8 illustrates a display screen (or window within a display screen) 85 showing the transformed RHS trace 83" aligned to the datum trace 81. The dashed line 86 in FIG. 8 illustrates the difference between the aligned transformed RHS trace 83" and the datum trace 81 and also illustrates the extent of overlap of the two traces. The controller causes the data storer 52 to store the transformed and aligned first measurement data set.

Figure 9:
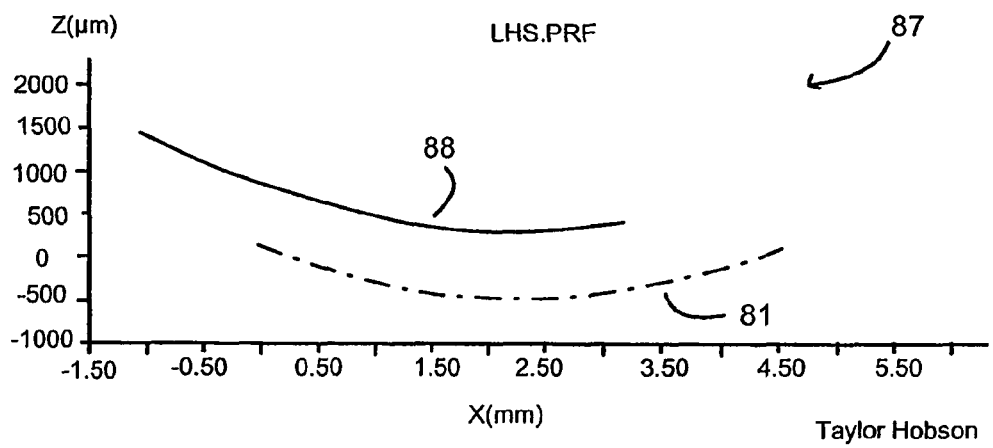
FIG. 9 illustrates a display screen showing a second measurement trace representing the second measurement data set produced by measurement of the second section in FIG. 5c (with the reference trace being shown in dot-dash lines), after approximate alignment of the second measurement trace to the reference trace.

The operator then instructs the data processor 50 via the graphical user interface to display the second measurement section datum as the LHS trace together with the datum trace. The operator then uses the user operable controls of the GUI first to mirror or reflect the LHS trace. The operator then aligns the mirrored LHS trace roughly to the datum trace by eye in the manner described above for the RHS trace. This causes the controller 59 to instruct the data transformer 54 at S7 in FIG. 4 to reflect and transform the second measurement section data set in accordance with the reflection and transformation of the LHS trace by the operator. FIG. 9 illustrates a display screen (or window within a display screen) 87 showing the reflected or mirrored LHS trace 88 roughly aligned to the datum trace 81 by the operator. The controller 59 causes the data storer 52 to store the reflected transformed second measurement data set.

Figure 10:
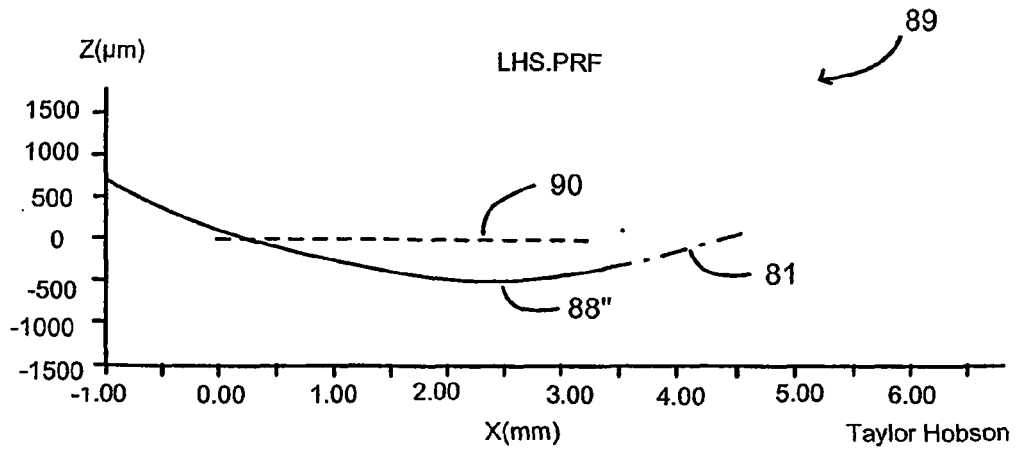
FIG. 10 illustrates a display screen showing the second measurement trace and reference trace (with the reference datum trace being shown in dot-dash lines), after least squares fitting of the second measurement trace to the reference trace.

The operator then instructs the controller 59 to cause the data aligner 55 to align the reflected and transformed LHS trace 88 to the datum trace 81, that is to align the stored reflected and transformed second measurement data set to the reference data set. The data aligner 55 thus at S8 in FIG. 4 uses the alignment procedure discussed above with respect to S6 to align the reflected and transformed LHS trace 88 to the datum trace 81. FIG. 10 illustrates a display screen (or window within a display screen) 89 showing the reflected, transformed and aligned LHS trace 88" aligned to the datum trace 81. The dashed line 90 in FIG. 10 illustrates the difference between the aligned reflected and transformed LHS trace 88" and the datum trace 81 and also illustrates the extent of overlap of the two traces. The controller causes the data storer 52 to store the reflected, transformed and aligned second measurement data set.

The RHS and LHS traces (that is the first and second data sets) have thus now been independently aligned to the datum trace (that is the reference data set). In this example, the reference data set is not used in the remaining processes required to produce the profile.

Figure 11:
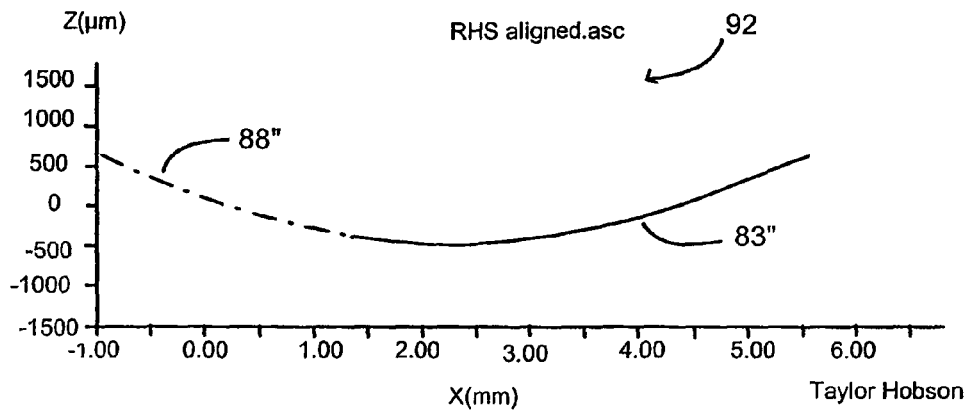
FIG. 11 illustrates a display screen showing the diametral profile produced by merging together the first and second measurement traces after respective separate alignment to the reference trace.

Once the LHS trace has aligned to the datum trace then, at S9, under instruction from the controller 59, the output provider 58 displays the aligned and transformed RHS trace 83" and the aligned, reflected and transformed LHS trace 88". FIG. 11 shows a display screen 92 displaying these two aligned traces 83" and 88' (the LHS trace 88" is shown by a dot-dash line).

The controller 59 then causes the data merger 56 at S10 to merge the overlapping areas of the aligned first and second data sets. There are numerous ways of merging the two data sets. In one example, the final data set representing the profile includes points from both measurement data sets in the overlap region without modification so that traversing the centre of the profile from the left the data points come alternately from the LHS and RHS traces. The total number of data points in the final data set is equal to the sum of the data points in both data sets. Another approach is to replace the points in the overlap region with estimated values based on a weighted average of the data. This will reduce the number of points in the final data set and will smooth out some of the apparent "noise" in the central region caused by the simple merging technique.

Physical parameters of the component, for example the roughness parameter $R_a$, or peak-to-trough profile height $R_t$ may be determined from the merged profile Such parameters can be used in a quality assurance process, for comparing the measured parameters with the nominal manufactured values for a component.

Figure 12:
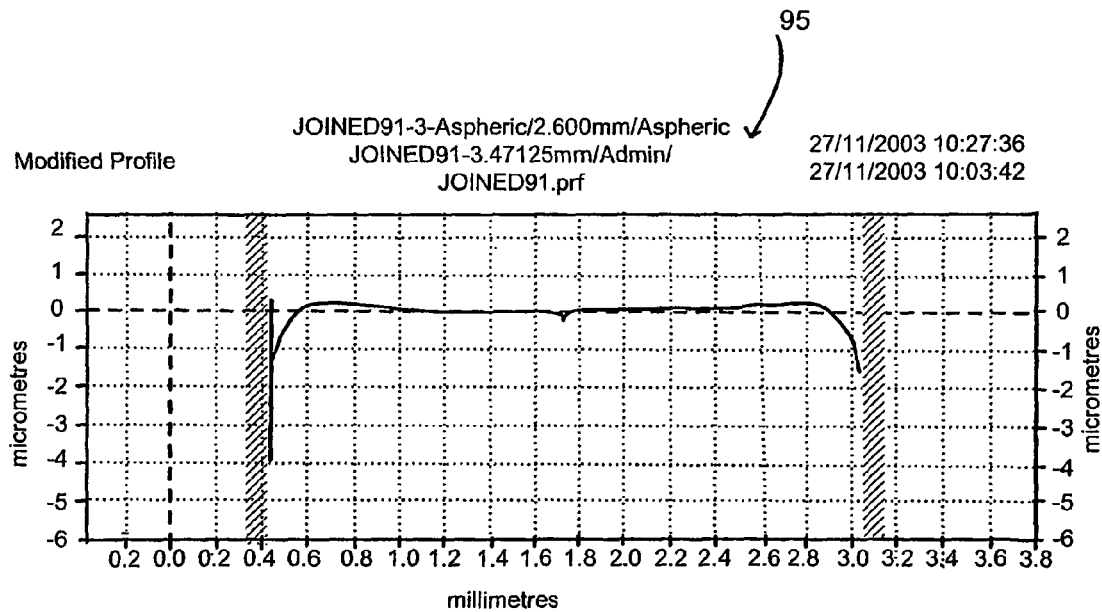
FIG. 12 illustrates a display screen showing a trace representing the effect of removing the expected surface form from a profile obtained using a method embodying the invention.

The profile of an aspheric component is typically represented by a polynomial equation. It is possible to determine the error between the measured profile and the expected polynomial profile by removing the expected polynomial form using, for example, the above-mentioned the μLTRA® software package. FIG. 12 shows a display screen 95 illustrating the results of such a form removal procedure. From FIG. 12 it can be seen that across the majority of the diametric profile of the component, between 1.0 and 2.4 mm in the x-direction in this example, the errors are small. Larger errors are present towards the periphery of the component, which is an artefact of the turning process which is typically used to manufacture aspheric components. An additional artefact of this process is a central non-uniformity which typically exists at the position of the centre of the turning process. This non-uniformity can be seen by the slightly increased error at x=1.7 mm in FIG. 12.

To illustrate the effectiveness of the above-described technique, a method embodying the invention and a method using only the measurement data sets, that is without using the reference data set or datum trace, have been compared with a method using a single continuous measurement path.

Figure 13:
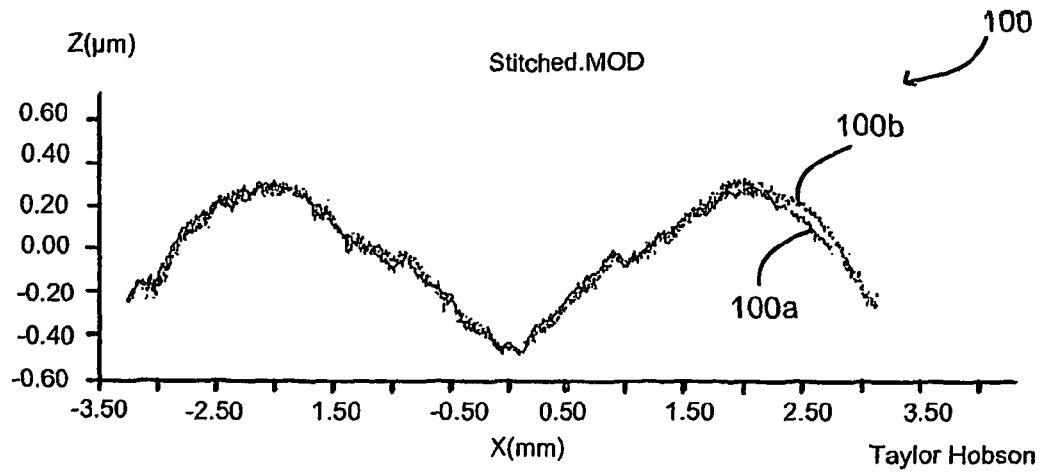
FIG. 13 shows a comparison of the profiles obtained using a method embodying the invention and a method using a single continuous measurement path, after removal of the base aspheric form.

FIG. 13 shows a display screen 100 illustrating on an enlarged scale the profile 100a obtained by the method described above and the profile 100b obtained by a method using a single continuous measurement path on an aspheric component that allowed a single continuous measurement to be made using the metrological instrument described above, following removal of the aspheric form. As can be seen there is very little difference between these two traces.

FIGS. 14 to 18 show display screens 101 to 105 illustrating, for comparative purposes, a method in which the first and second measurement data sets are obtained as described above but the reference data set is not obtained.

Figure 14:
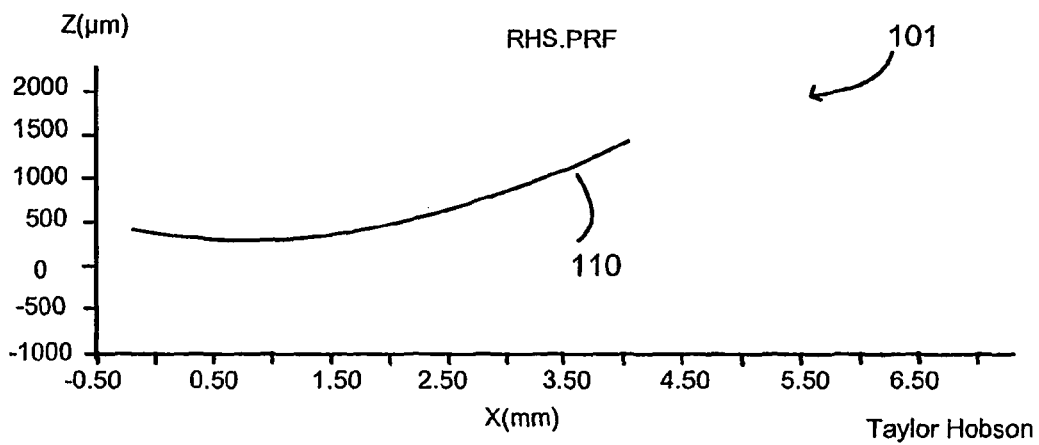
FIG. 14 illustrates a display screen showing a first measurement trace representing a measurement data set produced by measurement of the first section in FIG. 5b in a comparative method in which no reference data set is used.
Figure 15:
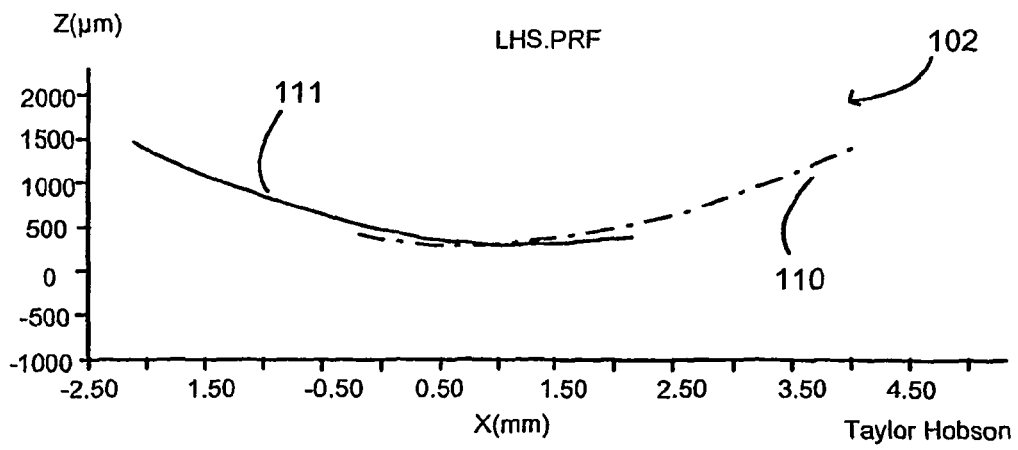
FIG. 15 illustrates a display screen showing alignment of a second measurement trace with the first measurement trace in the comparative method.
Figure 16:
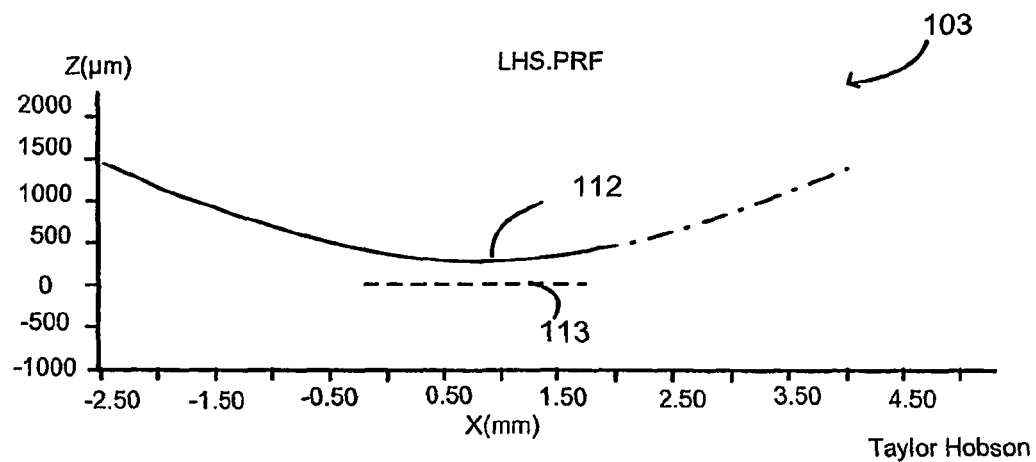
FIG. 16 illustrates a display screen showing the profile produced by merging together the first and second measurement traces after alignment in the comparative method.

FIG. 14 shows a display screen 101 illustrating the RHS trace 110 filtered and rotated through a nominal angle. FIG. 15 a display screen 102 illustrating shows the LHS trace 111 roughly aligned by eye to the RHS trace 110 (shown in dot dash lines). FIG. 16 shows a display screen 103 illustrating the profile 112 resulting from operation of the data aligner 55 with the dashed line 113 showing the extent of the data on which the alignment is based. This is significantly shorter than for a method embodying the invention.

Figure 17:
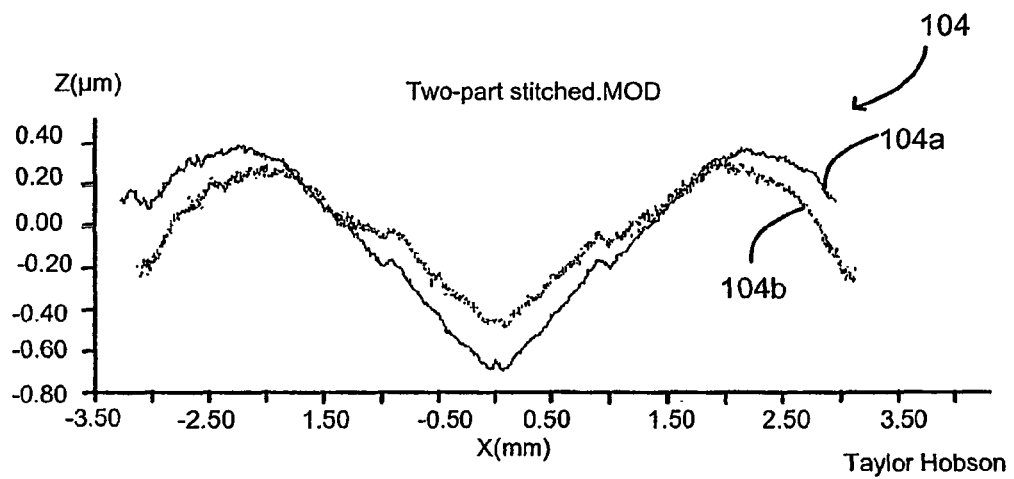
FIG. 17 illustrates a display screen showing the profiles obtained using a method using a single continuous measurement path and the comparative method, after removal of the base aspheric form.

FIG. 17 shows a display screen 104 illustrating on an enlarged scale, and following removal of the aspheric form, the profile 104a obtained by the method illustrated by FIGS. 14 to 16, that is without using the reference data set, and the profile 104b obtained by a method using a single continuous measurement path on an aspheric component that enabled a single continuous measurement to be made using the metrological instrument described above, following removal of the aspheric form. As can be seen there is significant difference between these two traces.

Figure 18:
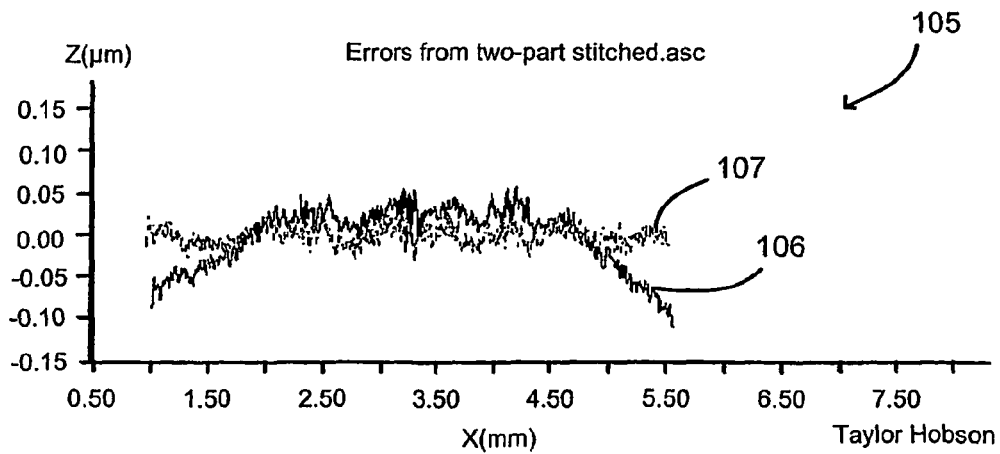
FIG. 18 illustrates a display screen showing the errors resulting from profiles obtained using a method embodying the invention and the comparative method.

FIG. 18 illustrates a display screen 105 showing the errors resulting from a profile 107 obtained using a method embodying the invention and a profile 106 resulting from the comparative method showing that the errors in the profile 106 due to the comparative method are much bigger than those due to a method embodying the invention and that their trend increases more rapidly with distance from the optical axis which would result in a perceived form error.

The method described above with reference to FIGS. 1 to 13 provides a much closer fit to the results obtained using a single continuous measurement path than does the method described with reference to the method illustrated by FIGS. 14 to 16 that does not use the reference data set or datum trace. In addition, the overall magnitudes of the errors associated with the two-trace measurement are much greater.

The difference in errors between the two and three-trace measurements is primarily due to the accuracy with which traces can be aligned. With only two traces (which, because of access and/or surface gradient problems, may extend only a smaller distance to their respective opposite sides of the reference axis), the degree of overlap between the traces is small which means there is a greater range of possible relative positions between the two traces, which will yield substantially the same data in the region of overlap. Such a range of orientations gives rise to errors, as it cannot be determined which orientation is correct. Conversely, by using the datum trace, it is possible to obtain a continuous measurement across the reference axis of the component, which enables the region of overlap between this and the RHS or LHS trace to be much greater. As a result, there are a greater number of constraints to be supplied to a fitting algorithm for example which will inevitably reduce the error in the relative orientations of the LHS and RHS traces.

In the above-described method, the reference datum is provided by a central measurement trace. In another method embodying the invention, the reference datum is provided by, instead of a central measurement trace, measurements made on the planar mould surfaces ("wings" or "flats") 62a and 62b (FIGS. 5a to 5b) bounding the lens mould surface 61. The two flats 62a and 62b form, within manufacturing tolerances, parallel planes that may be used to provide reference data with regard to the orientation of the aspheric form.

In this method, a reference data set is obtained by making measurements on respective reference paths 61f (shown in dashed lines in FIG. 5a) on the flats 62a and 62b with the mould in the non-tilted position shown in FIG. 5a to provide the datum (the reference paths 61f shown in dashed lines in FIG. 5a). The first and second measurement paths are then controlled so that each extends onto the respective adjacent flat 62a and 62b as shown by the dashed lines 61f and 61g in FIGS. 5b and 5c. The first measurement data set is then rotated and translated so as to align the flat portion of the data with the corresponding section of the datum. The second measurement data set is then mirrored, rotated and translated so as to align the flat portion of the data with the corresponding section of the datum. By doing this the angle subtended between the flat portion of the first measurement data set and the flat portion of the second measurement data set will be equal to the angle subtended between the two flat portions of the datum. The measurement data sets are then translated in x and z to provide the best fit in the overlap region as determined by a least squares alignment.

Figure 19A:
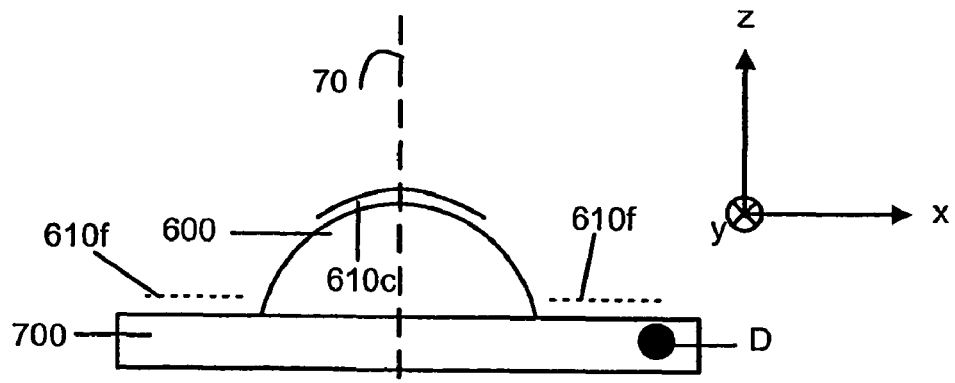
FIG. 19 consists of FIGS. 19a to 19c and shows schematic representations illustrating the orientations of a workpiece in the form of a lens during a method embodying the invention with FIG. 19a showing the orientation during a measurement of a centre section of the measurement path to obtain a reference data set, FIG. 19b showing the orientation during a measurement of a first measurement section at one end of the measurement path to obtain a first measurement data set and FIG. 19c showing the orientation during a measurement of a second measurement section at the other end of the measurement path to obtain a second measurement data set.
Figure 19B:
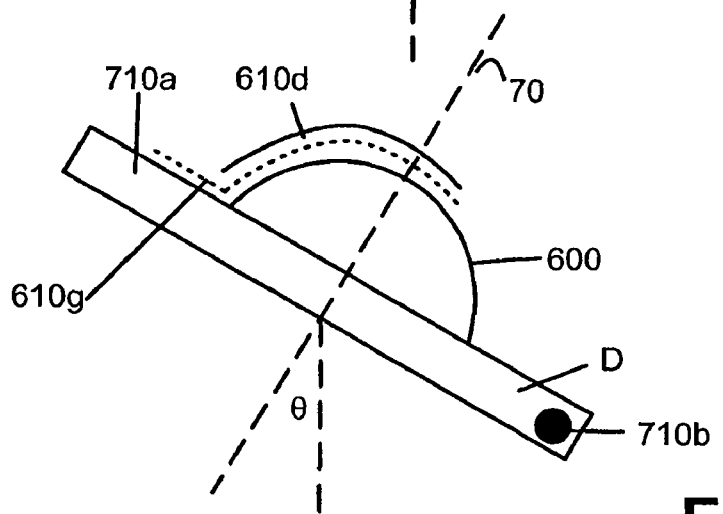
Figure 19C:
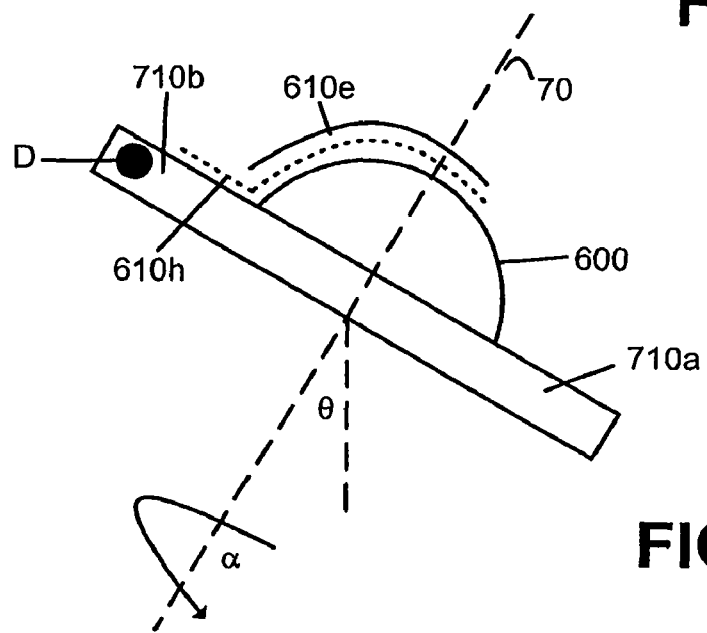

In the examples given above, the component had a concave surface to be measured. FIGS. 19a to 19c show figures equivalent to FIGS. 5a to 5c for a convex aspheric surface 610 of a component 600 such as an aspheric lens that may be used in a digital camera, mobile telephone or an optical storage device such as a DVD recorder. The method described above with reference to FIGS. 4 to 13 may be used on this component in which case the first and second measurement path sections and the reference path section are represented in FIG. 19a by lines 610d, 610e and 610c, respectively. The second method described above may also be used where, as shown in FIGS. 19a to 19c the component is securely mounted on a glass flat 700 in the chuck. In this case, the parts 710a and 710b of the glass flat bounding the component take the place of the wings or flats of the mould and the reference paths are shown by the dashed lines 610f and the first and second measurement paths by the dashed lines 610g and 610h in FIGS. 19a to 19c. The black dot D is again provided to enable the rotation to be seen.

It will be appreciated that the alignment procedure used by the data aligner 55 may be sufficiently powerful and may converge sufficiently quickly that prior rough alignment is not necessary.

In any of the methods described above, a complete three-dimensional surface topography of a component may be obtained by measuring a series of diametric profiles at different angles of a about the optical axis of the component, that is by obtaining pairs of first and second measurement data sets at measurements at $\alpha=0+n$ and $\alpha=180+n$, where n increases by a predetermined angular increment between the pairs. The topography may then be represented by a "framework" formed from the two-dimensional profiles, or as a continuous three-dimensional topography by interpolation between the measured profiles. As another possibility, or additionally, where the workpiece is rotationally symmetric, then the different measured profiles may be averaged.

As mentioned above, tilting of the support arm and rotation of the platform may be automated. In addition, it may be possible to automate the rough alignment procedures described above as being carried out by the user, using the tilt and rotation angles provided by the user (or data provided by the θ and α position providers 37 and 39, if present) and the x data provided by the x position provider 34. If so, many of the display screens described above need not necessarily be displayed to the operator.

The interferometric z displacement provider 35 may be replaced by any other suitable form of transducer such as an inductive gauge (for example an LVDT). Similarly, the x position provider 34 need not necessarily be a grating but could be any other suitable form of transducer such as an interferometer.

A method embodying the invention may be applied where the stylus arm extends in the z direction and so moves parallel to its length rather than pivots as it follows the surface as in U.S. Pat. No. 6,344,656. The measurement technique described above can be applied regardless of the method by which the surface probed determines or follows the surface. The probe may or may not make contact with the surface, for example the probe may be an atomic force probe. Also the invention may be applied to a coordinate measuring type machine in which independent measurements of x and z are used to determine the surface form, rather than logging change in z with x.

The present invention may be applied to any aspheric component including toric components and diffractive components. In addition, the present invention is not limited to rotationally symmetric components.

As described above the component is rotated before the second set of measurements is taken. Where the traverse unit can make measurements along both forward and reverse paths in the x direction, it may be possible simply to tilt the component in the other direction rather than to rotate it. In this case, the support platform need not necessarily be rotatable.

The present invention may be applied to the measurement of form of any component but will be particularly advantageous where, as described above, either at least a part of the gradient of the surface to be measured or difficulty of accessing the surface means that it is desirable to split the measurement path into sections. It may also be possible to apply the present invention to cases where the measurement path is split into more than two sections with, in the case of the method described with reference to FIGS. 4 to 13, a respective reference data set being obtained for each pair of a measurement data sets to be stitched together. For example, a weighted combination of three or more traces may be used.

As described above, the first and second measurement paths overlap. The present invention may be applied where the first and second measurement paths simply abut but do not overlap with each other and possibly even where there is a gap between the first and second measurement paths. In the latter case when the method described with reference to FIGS. 4 to 14 is used, the results of the measurement of the reference path section itself may be used to form part of the surface profile of the component. In such a case, the data merger 56 may also be able to generate a continuous profile by using a polynomial fitting procedure to fill in the missing data. The technique is also applicable to components that have an interruption such as a hole in their topography, rather than only components whose surface is continuous and uninterrupted.

In cases where the component under test is very small, particularly with a concave profile, it may be possible to perform the calibration by using a separate component with a convex profile instead. The test component can then be arranged in the position of the separate component used during calibration. Alternatively, a separate component with a larger concave profile could be used. As a third alternative, the support assembly may be provided with an accurate alignment tool which avoids the need to perform the calibration.

The control apparatus 3 and the metrological instrument 2 need not necessarily be physically located together but could be coupled by a remote communications link, for example via a network.

The invention claimed is:

1. A metrological instrument for determining a surface profile of a surface of a component, the instrument comprising:
    a component support to support the component;
    a mover to effect relative movement between a measurement probe and the component support so that the measurement probe follows changes in the surface of the component in a direction perpendicular to a direction of the relative movement;
    a measurer to provide measurement data indicating a displacement of the measurement probe as the measurement probe follows the changes in the surface of the component;
    an orientation controller to control an orientation of the component; a measurement controller to control the mover to cause
        the measurement probe to follow a reference measurement path along the surface with the component in a first orientation so that the measurer obtains reference data,
        the measurement probe to follow a first section of a measurement path along the surface with the component in a second orientation so that the measurer obtains first measurement data, and
        the measurement probe to follow a second section of the measurement path along the surface with the component in a third orientation so that the measurer obtains second measurement data; and
    a processor to process the measurement data, the processor being operable:
    to define a datum using the reference data obtained by the measurer when the measurement probe follows the reference measurement path with the component in the first orientation,
    to align the first measurement data obtained by the measurer when the measurement probe follows the first section of the measurement path with the component in the second orientation to the datum to produce aligned first measurement data,
    to align the second measurement data obtained by the measurer when the measurement probe follows the second section of the measurement path with the component in the third orientation to the datum to produce aligned second measurement data, and then
    to use the aligned first and second measurement data to generate the surface profile of the surface of the component.

2. A metrological instrument according to claim 1, wherein the processor is operable to align the measurement data to the datum by determining the relative orientations at which reference data and measurement data were obtained, by transforming the measurement data to compensate for the relative orientations and by fitting the measurement data to the reference data.

3. A metrological instrument according to claim 1, wherein the processor is operable to align the measurement data to the datum by determining the relative orientations at which reference data and measurement data were obtained, by transforming the measurement data to compensate for the relative orientations and by fitting the measurement data to the reference data using a least squares fitting procedure.

4. A metrological instrument according to claim 2, wherein the processor is operable to determine the relative orientations at which the reference data and measurement data were obtained by displaying respective traces representing the reference and measurement data to an operator to allow the operator to re-orientate the measurement data so as visually to align the measurement data to the reference data.

5. A metrological instrument according to claim 1, wherein the measurement controller is operable to control the mover so that the reference measurement path is provided by a third section of the measurement path.

6. A metrological instrument according to claim 5, wherein the surface is a lens surface and the measurement controller is operable to control the mover so that the first, second and third sections of the measurement path are respective sections of a diametral path across the surface.

7. A metrological instrument according to claim 5, wherein the surface is a recessed surface of a mould and the measurement controller is operable to control the mover so that the first, second and third sections of the measurement path are respective sections of a diametral path across the surface.

8. A metrological instrument according to claim 5, wherein the measurement controller is operable to control the mover so that the third section of the measurement path encompasses an axis of symmetry of the surface being measured.

9. A metrological instrument according to claim 5, wherein the measurement controller is operable to control the mover so that the third section of the measurement path overlaps each of the first and second sections of the measurement path.

10. A metrological instrument according to claim 1, wherein the measurement controller is operable to control the mover to cause the measurement probe to include in the first and second measurement paths areas that provide reference data and the processor is operable to align the measurement data to the datum provided by the reference data by using the reference data provided by the corresponding areas of the first and second measurement paths and by fitting the measurement data to the reference data.

11. A metrological instrument according to claim 1, wherein the measurement controller is operable to control the mover to cause the measurement probe to include in the first and second measurement paths areas that provide reference data and the processor is operable to align the measurement data to the datum provided by the reference data by using the reference data provided by those corresponding areas of the first and second measurement paths and by fitting the measurement data to the reference data using a least squares fitting procedure.

12. A metrological instrument according to claim 1, wherein the measurement controller is operable to control the mover so that the reference data is obtained by following a reference path on a planar surface forming part of the component or fixed for movement and rotation with the component and the corresponding areas of the first and second measurement paths are provided by that planar surface.

13. A metrological instrument according to claim 12, wherein the surface is a recessed surface of a mould and the measurement controller is operable to control the mover so that the reference path and the corresponding areas of the first and second measurement paths are provided by portions of a planar surface of the mould bounding the surface.

14. A metrological instrument according to claim 12, wherein the surface is a lens surface of a lens that is mounted on a flat surface on the component support and the measurement controller is operable to control the mover so that the reference path and the corresponding areas of the first and second measurement paths are provided by portions of the flat surface bounding the lens.

15. A metrological instrument according to claim 1, wherein the first and second sections of the measurement path are respective sections of a diametral path across the surface.

16. A metrological instrument according to claim 1, wherein the measurement controller is operable to control the mover so that the first and second sections of the measurement path overlap.

17. A metrological instrument according to claim 1, wherein the measurement controller is operable to control the mover to cause the measurement probe to follow at least one further section of the measurement path so that the measurer obtains at least one further set of measurement data and the processor is operable to align the at least one further set of measurement data to the reference data or to another set of reference data obtained by the measurement controller controlling the mover to cause the measurement probe to follow another reference path.

18. A metrological instrument according to claim 1, wherein the component support comprises a support platform that is rotatable or tiltable to change the orientation of the component.

19. A metrological instrument according to claim 1, wherein the component support comprises a support platform that is manually rotatable or tiltable to change the orientation of the component.

20. A metrological instrument according to claim 18, wherein the support platform is carried by a support member which is rotatable about an axis extending at an angle to the direction in which the component is oriented.

21. A metrological instrument according to claim 1, wherein the component support comprises a support platform configured to receive the component with an axis of symmetry of the component perpendicular to a surface of the support platform and coincident with a rotation axis of the support platform, the support platform being carried by a support member which is rotatable to change the orientation of the axis of symmetry of the component and thus the orientation of the component.

22. A metrological instrument according to claim 21, wherein the support comprises a chuck for holding the component.

23. A metrological instrument according to claim 1, wherein the first and second orientations are mirror images and the third orientation is with the component not tilted.

24. A metrological apparatus according to claim 1, wherein the measurement controller and processor are operable to cause respective profiles to be determined for different measurement paths across the surface and the processor is operable to determine at least one of a three dimensional form and an average two dimensional profile for the surface.

25. A metrological instrument according to claim 1, wherein the processor is operable to remove an expected form from the profile or three dimensional form to provide an indication of the error from the expected form.

26. A metrological instrument according to claim 1, further comprising the measurement probe in the form of a stylus.

27. A metrological instrument according to claim 1, wherein the measurement probe comprises a pivotable arm carrying a stylus and wherein the arm is mounted so as to pivot as the stylus follows the surface.

28. A metrological instrument according to claim 1, wherein the measurer comprises an interferometric measurer.

29. A data processing apparatus for use in a metrological instrument in accordance with claim 1, the data processing apparatus comprising:
a receiver configured to receive the reference data obtained by causing the measurement probe to follow the reference measurement path with the component in a first orientation, the first measurement data obtained by causing the measurement probe to follow the first section of the measurement path along the surface with the component in a second orientation, and the second measurement data obtained by causing the measurement probe to follow the second section of the measurement path along the surface with the component in a third orientation; and
a processor to process the measurement data, the processor being operable:
to define the datum using the reference data obtained by the measurer when the measurement probe follows the reference measurement path with the component in the first orientation,
to align the first measurement data to the datum to produce the aligned first measurement data, the first measurement data being obtained by the measurer when the measurement probe follows the first section of the measurement path with respect to the surface of the component with the component in the second orientation to align the second measurement data to the datum to produce the aligned second measurement data, the second measurement data being obtained by the measurer when the measurement probe follows the second section of the measurement path with the component in the third orientation, and then to use the aligned first and second measurement data to generate the surface profile of the surface of the component.

30. A data processing apparatus according to claim 29, wherein the processor is operable to align the measurement data to the datum by determining relative orientations at which the reference data and the measurement data were obtained, by transforming the measurement data to compensate for the relative orientations and by fitting the measurement data to the reference data.

31. A data processing apparatus metrological instrument according to claim 29, wherein the processor is operable to align the measurement data to the datum by determining relative orientations at which the reference data and the measurement data were obtained, by transforming the measurement data to compensate for the relative orientations and by fitting the measurement data to the reference data using a least squares fitting procedure.

32. A data processing apparatus according to claim 30, wherein the processor is operable to determine the relative orientations at which the reference data and the measurement data were obtained by displaying respective traces representing the reference and measurement data to an operator to allow the operator to re-orientate the measurement data so as visually to align the measurement data to the reference data.

33. A data processing apparatus according to claim 29, wherein the receiver is operable to receive reference data in each orientation of the component and the processor is operable to align the measurement data to the datum by determining from the respective reference data the relative orientations at which the measurement data were obtained, by transforming the measurement data to compensate for the relative orientations and by fitting the measurement data to the reference data.

34. A data processing apparatus according to claim 29, wherein the receiver is operable to receive reference data in each orientation of the component and the processor is operable to align the measurement data to the datum by determining from the respective reference data the relative orientations at which the measurement data were obtained, by transforming the measurement data to compensate for the relative orientations and by fitting the measurement data to the reference data using a least squares fitting procedure.

35. A data processing apparatus according to claim 29, wherein the processor is operable to cause respective profiles to be determined for different measurement paths across the surface and to determine at least one of a three dimensional form and an average two dimensional profile for the surface.

36. A data processing apparatus according to claim 29, wherein the processor is operable to remove an expected form from the profile or from a three dimensional form to provide an indication of an error from the expected form.

37. A component support assembly for use with a metrological instrument according to claim 1, wherein the support comprises a stand configured to be mounted on a support base of the metrological instrument and a support platform rotatably mounted to the stand to enable the orientation of the component to be changed in a direction perpendicular to both the direction of relative movement between the measurement probe and the component support assembly, and a direction in which a measurement probe follows changes in a surface during relative movement between the measurement probe and the component support assembly.

38. A component support assembly according to claim 37, wherein the support platform is manually rotatable or tiltable to change the orientation of the component.

39. A component support assembly according to claim 37, wherein the support platform is rotatably mounted to the stand by a support member, the support platform is configured to receive the component with an axis of symmetry of the component perpendicular to a surface of the support platform and coincident with an axis about which the support platform is rotatable relative to the support member.

40. A method of determining a surface profile of a surface of a component, the method comprising:

effecting relative movement between a measurement probe and a component support to cause the measurement probe to follow a reference measurement path along the surface of the component with the component in a first orientation to obtain reference data indicating a displacement of the measurement probe as the measurement probe follows the changes in the reference path, to cause the measurement probe to follow a first section of a measurement path along a surface of the component with the component in a second orientation to obtain first measurement data indicating the displacement of the measurement probe as the measurement probe follows changes in the first section of the measurement path, and to cause the measurement probe to follow a second section of the measurement path along the surface of the component with the component in a third orientation to obtain second measurement data indicating the displacement of the measurement probe as the measurement probe follows changes in the second section of the measurement path;

defining a datum using the reference data obtained by the measurer when the measurement probe follows the reference measurement path with the component in the first orientation;

aligning the first measurement data to the datum to produce aligned first measurement data, the first measurement data being obtained by the measurer when the measurement probe follows the first section of the measurement path with the component in the second orientation;

aligning the second measurement data to the datum to produce aligned second measurement data, the second measurement data being obtained by the measurer when the measurement probe follows the second section of the measurement path with the component in the third orientation; and using the aligned first and second measurement data to generate the surface profile of the surface of the component.

41. A method of processing data provided by a metrological instrument in accordance with claim 1, the method comprising a data processor:

receiving the reference data obtained by causing the measurement probe to follow a reference measurement path with the component in a first orientation, the first measurement data obtained by causing the measurement probe to follow the first section of the measurement path along the surface with the component in the second orientation, and the second measurement data obtained by causing the measurement probe to follow the second section of the measurement path along the surface with the component in the third orientation; defining the datum using the reference data;

aligning the first measurement data to the datum to produce aligned first measurement data;

aligning the second measurement data to the datum to produce aligned second measurement data; and using the aligned first and second measurement data to generate the surface profile of the surface of the component.

42. A non-transitory computer readable medium encoded with program instructions for programming a processor to carry out a method in accordance with claim 40.

43. A non-transitory computer readable medium encoded with program instructions for programming a processor to become configured to provide data processing apparatus in accordance with claim 29.

44. A non-transitory computer readable medium encoded with program instructions for programming a processor of a metrological instrument to become configured to provide a metrological instrument in accordance with claim 1.

45. A metrological instrument for determining a surface profile of a surface of a component, the instrument comprising: component support means for supporting the component; moving means for effecting relative movement between measurement probe means and the component support means so that the measurement probe means follows changes in the surface of the component in a direction perpendicular to a direction of the relative movement; measuring means for providing measurement data indicating the displacement of the measurement probe means as the measurement probe means follows changes in the surface; orientation control means for controlling orientation of the component; measurement controlling means for controlling the moving means to cause the measurement probe means to follow a reference measurement path along the surface with the component in a first orientation so that the measuring means obtains reference data, the measurement probe means to follow a first section of a measurement path along the surface with the component in a second orientation so that the measuring means obtains first measurement data, and the measurement probe means to follow a second section of the measurement path along the surface with the component in a third orientation so that the measuring means obtains second measurement data; and processing means for processing the measurement data, the processing means being operable to define a datum using the reference data obtained by the measurer when the measurement probe follows the reference measurement path with the component in the first orientation, to align the first measurement data to the datum to produce aligned first measurement data, the first measurement data being obtained by the measurer when the measurement probe follows the first section of the measurement path with the component in the second orientation;

to align the second measurement data to the datum to produce aligned second measurement data, the second measurement data being obtained by the measurer when the measurement probe follows the second section of the measurement path with the component in the third orientation, and then to use the aligned first and second measurement data to generate the surface profile of the surface of the component.

46. A metrological instrument for determining a surface profile of a surface of a component, the instrument comprising:

a component support to support the component;

a mover to effect relative movement between a measurement probe and the component support so that the measurement probe follows changes in the surface of the component in a direction perpendicular to the relative movement direction;

a measurer to provide measurement data indicating a displacement of the measurement probe as the measurement probe follows the changes in the surface of the component;

a measurement controller to control the mover to cause the measurement probe to follow a reference measurement path along the surface of the component with the component in a first orientation relative to the measurement probe so that the measurer obtains reference data, the measurement probe to follow a first section of a measurement path along the surface of the component with the component in a second orientation relative to the measurement probe so that the measurer obtains first measurement data, and the measurement probe to follow a second section of the measurement path along the surface of the component with the component in a third orientation relative to the measurement probe so that the measurer obtains second measurement data; and a processor to process the measurement data, the processor being operable:

to define a datum using the reference data obtained by the measurer when the measurement probe follows the reference measurement path with the component in the first orientation, to align the first measurement data obtained by the measurer when the measurement probe follows the first section of the measurement path with the component in the second orientation to the datum to produce aligned first measurement data, to align the second measurement data obtained by the measurer when the measurement probe follows the second section of the measurement path with the component in the third orientation to the datum to produce aligned second measurement data, and then to use the aligned first and second measurement data to generate the surface profile of the surface of the component.

* * * * *